(12) United States Patent
Vacca et al.

(10) Patent No.: US 12,399,104 B2
(45) Date of Patent: Aug. 26, 2025

(54) CONFIGURABLE PARTICLE ANALYZER APPARATUSES AND METHODS

(71) Applicant: KINETIC RIVER CORP., Mountain View, CA (US)

(72) Inventors: Giacomo Vacca, Aptos, CA (US); Elijah Sassoon Kashi, San Francisco, CA (US); Alan Hap Chin, Mountain View, CA (US)

(73) Assignee: Kinetic River Corp., Mountain View, CA (US)

( * ) Notice: Subject to any disclaimer, the term of this patent is extended or adjusted under 35 U.S.C. 154(b) by 274 days.

(21) Appl. No.: 18/000,607

(22) PCT Filed: Jun. 3, 2021

(86) PCT No.: PCT/US2021/035773
§ 371 (c)(1),
(2) Date: Dec. 2, 2022

(87) PCT Pub. No.: WO2021/247918
PCT Pub. Date: Dec. 9, 2021

(65) Prior Publication Data
US 2023/0266227 A1    Aug. 24, 2023

Related U.S. Application Data

(60) Provisional application No. 63/034,387, filed on Jun. 3, 2020.

(51) Int. Cl.
*G01N 15/14* (2024.01)
*G01N 15/1404* (2024.01)
(Continued)

(52) U.S. Cl.
CPC ..... *G01N 15/1436* (2013.01); *G01N 15/1404* (2013.01); *G01N 2015/1006* (2013.01);
(Continued)

(58) Field of Classification Search
CPC .. G01N 15/14; G01N 15/1459; G01N 15/149; G01N 15/1404; G01N 15/1434;
(Continued)

(56) References Cited

U.S. PATENT DOCUMENTS

| 4,284,355 A | 8/1981 | Hansen et al. |
| 4,732,479 A | 3/1988 | Tanaka et al. |

(Continued)

FOREIGN PATENT DOCUMENTS

JP    H10197440 A    7/1998

OTHER PUBLICATIONS

International Preliminary Report on Patentability re PCT/US2021/035773 dated Dec. 6, 2022 (10 pages).
(Continued)

*Primary Examiner* — Mohamed K Amara
(74) *Attorney, Agent, or Firm* — Aurora Consulting LLC; Albert Du; Ashley Sloat

(57) ABSTRACT

This disclosure relates to configurable particle analyzer apparatuses and methods. In some embodiments, a modular particle analyzer includes a stray light blocking module including a focusing lens, a pinhole, and a collimating lens. The focusing lens is configured to focus light emitted from the flowcell through the pinhole. The pinhole is configured to block stray or scattered light emitted from the flowcell. The collimating lens is configured to substantially collimate the light exiting the pinhole to output a substantially collimated light beam. A modular particle analyzer may alternatively, or additionally, include a rod-and-cage architecture. A particle analyzer may alternatively, or additionally, include a sheath pressure control module and a sample pressure control module. Further, a particle analyzer may alternatively, or additionally, include a sample probe wash. Any of
(Continued)

the embodiments described herein may be combined with any one or more of the other embodiments described herein.

20 Claims, 23 Drawing Sheets

(51) Int. Cl.
　　*G01N 15/1434*　　(2024.01)
　　*G01N 15/10*　　　(2006.01)
　　*G01N 15/1409*　　(2024.01)
　　*G01N 15/149*　　 (2024.01)

(52) U.S. Cl.
　　CPC .. *G01N 15/1409* (2024.01); *G01N 2015/1452* (2013.01); *G01N 15/149* (2024.01); *G01N 2201/024* (2013.01)

(58) Field of Classification Search
　　CPC .............. G01N 15/1436; G01N 15/06; G01N 15/1463; G01N 15/147; G01N 15/10; G01N 2201/024; G01N 2015/1006
　　USPC .................................. 356/335–343, 73, 246
　　See application file for complete search history.

(56) References Cited

U.S. PATENT DOCUMENTS

| | | | | |
|---|---|---|---|---|
| 4,957,363 A * | 9/1990 | Takeda | ............... | G01N 15/1434 250/222.2 |
| 5,136,433 A | 8/1992 | Durell | | |
| 5,436,717 A * | 7/1995 | Ogino | ................ | G01N 15/1404 356/73 |
| 5,469,251 A * | 11/1995 | Kosaka | .............. | G01N 15/1433 356/336 |
| 5,715,182 A * | 2/1998 | Asai | ....................... | G01N 15/14 706/924 |
| 5,757,476 A | 5/1998 | Nakamoto et al. | | |
| 7,758,811 B2 * | 7/2010 | Durack | .................... | C12N 5/06 436/63 |
| 8,066,389 B2 | 11/2011 | Silverstein et al. | | |
| 8,218,840 B2 * | 7/2012 | Eisfeld | .................... | A61P 35/00 359/368 |
| 9,658,148 B2 | 5/2017 | Vacca | | |
| 11,833,510 B2 * | 12/2023 | Perkins | .............. | G01N 15/1459 |
| 2002/0009391 A1 * | 1/2002 | Marquiss | ............ | G01N 35/028 422/65 |
| 2004/0075842 A1 * | 4/2004 | Dunn | ................. | G01B 9/02042 356/511 |
| 2007/0058252 A1 | 3/2007 | Fritz | | |
| 2008/0204719 A1 * | 8/2008 | Trainer | .............. | G01N 15/1459 356/73 |
| 2008/0285395 A1 * | 11/2008 | Tanaka | ................. | G11B 7/1369 |
| 2009/0234204 A1 * | 9/2009 | Ridder | ................. | A61B 5/0059 600/310 |
| 2011/0134426 A1 | 6/2011 | Kaduchak et al. | | |
| 2014/0065637 A1 * | 3/2014 | Kirk | ................... | G01N 15/1433 435/7.1 |
| 2015/0115174 A1 * | 4/2015 | Chen | ................... | F04B 11/0025 250/216 |
| 2015/0160243 A1 | 6/2015 | Vacca et al. | | |
| 2018/0143182 A1 | 5/2018 | Wanders et al. | | |
| 2018/0259762 A1 * | 9/2018 | Fujimoto | ........... | G01N 21/6428 |
| 2020/0030794 A1 * | 1/2020 | Perkins | .............. | G01N 35/1095 |
| 2020/0359903 A1 * | 11/2020 | Haji Reza | .......... | G01B 9/02081 |
| 2021/0011266 A1 * | 1/2021 | Hamilton | ............ | G02B 21/0076 |
| 2024/0265530 A1 * | 8/2024 | Ecclestone | ............ | G06T 7/0012 |

OTHER PUBLICATIONS

Extended European Search Report dated May 8, 2024 re EP 21819010.6-1001 / 4162254 PCT/US2021035773 (12 pages).

Schroeder G M et al. article titled "Introduction to Flow Cytometry," Jan. 1, 2004, No. version 5.1 Jan. 1, 2004 (Jan. 1, 2004), pp. 1-182, XP008148070, Retrieved from the Internet: URL:http://appliedtechnologyproducts.com/Send/IntroductiontoFlowCytometry5-1.pdf (182 pages).

* cited by examiner

FIG. 3C

| Valve / Mode | 301 | 302 | 303 | 304 | 305 | 306 | 307 |
|---|---|---|---|---|---|---|---|
| Run | Closed | Closed | Open | Open | Closed | Open | Closed |
| Backflush | Closed | Open | Open | Closed | Open | Closed | Open |
| Fill | Closed | Closed | Open | Open | Closed | Open | Open |
| Drain | Open | Closed | Closed | Closed | Open | Closed | Open |
| Standby | Closed | Closed | Closed | Closed | Closed | Closed | Open |

CONFIGURABLE PARTICLE ANALYZER APPARATUSES AND METHODS

CROSS-REFERENCE TO RELATED APPLICATIONS

This application is a 35 U.S.C 371 National Stage filing for PCT Application Ser. No. PCT/US2021/035773, filed Jun. 3, 2021, now published as WO 2021/247918, which claims the priority benefit of U.S. Provisional Patent Application Ser. No. 63/034,387, filed on Jun. 3, 2020, the contents of each of which are herein incorporated by reference in their entireties.

TECHNICAL FIELD

This disclosure pertains to the fields of Particle Analysis, Cell Analysis, Microbiology, and Water Quality Monitoring. In particular, embodiments disclosed herein are capable of increased sensitivity in Flow Cytometry and label-free Flow Cytometry.

BACKGROUND

Cellular analysis and microbiological analysis have been in widespread use in life science research and medical diagnostics alike. Yet as certain applications become routine, new gaps emerge, exposing shortcomings and demanding better solutions.

Cellular analysis and microbiological analysis of bacteria, algae, and other small particles is conventionally performed using techniques such as culturing, microscopy, and flow cytometry using fluorescent biochemical labels, which can be slow and/or lack in statistical significance. For example, in the fields of water quality monitoring and milk supply quality monitoring, it is desired to obtain results rapidly and inexpensively. Culturing of samples provides definitive results on the presence of bacterial colonies or infection, but at the expense of unacceptable delays on the order of days to a week or more. Microscopy imaging of samples either does not provide coverage of sufficient sample volumes to ensure statistical significance, or requires additional time-consuming concentration steps, like centrifugation, to increase the chance of detection. Flow cytometry has the benefit of rapid interrogation of larger sample sizes, along with the capacity for high event detection rates, but generally requires the use of added ("exogenous") fluorescent biochemical labels to mark and help detect cells or other biological or microbiological particles of interest. Such labels (typically monoclonal antibodies conjugated to reporter fluorophores, or intravital nuclear stains), while in many cases highly sensitive and even specific, are generally expensive, and the incubation process causes delays and prevents streamlined, inline-sampling workflows.

Cellular analysis has been performed using fluorescence measurements on molecular species native to the systems under study. In these cases, the process of fluorescence is sometime referred to as autofluorescence or endogenous fluorescence, and does not depend on the introduction of external fluorophores, but rather relies on the intrinsic fluorescence of molecules already present (generally naturally so) in the cell to be analyzed. One practical application of the principle of endogenous fluorescence is in the discrimination of bacterial from algal cells, as well as the discrimination of both from inorganic debris, based on the different preponderance of various endogenously fluorescent compounds in the different particles of interest.

Conventional cell analyzers typically have fixed architectures, with little opportunity to adapt their operation for specific user needs. For example, flow cytometers can come with a fixed, small selection of excitation light sources, and the only user choice is how many of those pre-made selections to include in the product to be purchased. The flow rate of the sample suspension fluid in flow cytometers is generally fixed or selectable in large discrete steps (e.g., "high," "medium," and "low" sample flow rates), and the time that particles in a sample spend in the optical interrogation region ("transit time") is generally unchangeable. As a result of the rigid architectures of conventional flow cytometers, they are ill suited for the analysis of certain samples. For example, detection of very small particles such as, e.g., extracellular vesicles and most bacteria, is hampered by too rapid a passage through the laser beam. Likewise, analysis of rare events in large-volume samples is not well served by fixed flow rates intended for samples with much greater abundances.

SUMMARY

The present disclosure provides techniques for a configurable flow cytometry apparatus and methods. One aspect of the present disclosure is directed to a modular particle analyzer, comprising: a first excitation source module configured to output a first substantially collimated light beam; a flowcell configured to receive a sample therethrough, such that the sample is illuminated by the first substantially collimated light beam when in the flowcell; a stray light blocking module comprising a focusing lens, a pinhole, and a collimating lens, such that the focusing lens is configured to focus light emitted from the flowcell through the pinhole, such that the pinhole is configured to block stray or scattered light emitted from the flowcell, and such that the collimating lens is configured to substantially collimate the light exiting the pinhole to output a second substantially collimated light beam; and a first detection module. In any of the embodiments described herein, the first detection module comprises: a dichroic beamsplitter configured to separate the second substantially collimated light beam into a third substantially collimated light beam and a fourth substantially collimated light beam, such that the spectra of the third and the fourth substantially collimated light beams are different from one another; and a first photodetector configured to detect the third substantially collimated light beam, and a second photodetector configured to detect the fourth substantially collimated light beam.

In any of the embodiments described herein, a modular particle analyzer may further comprise: from one to three additional excitation source modules, each emitting an additional substantially collimated light beam; and from one to three beam combiners configured to combine the first substantially collimated light beam and the additional substantially collimated light beams from the additional excitation source modules.

In any of the embodiments described herein, a modular particle analyzer may further comprise a rod-and-cage architecture, such that the one to three beam combiners are each coupled to a kinematic mount. In any of the embodiments described herein, the kinematic mount may optionally be magnetically coupled to a corresponding base.

In any of the embodiments described herein, a first excitation source module of the first excitation source module comprises a first laser that emits light at a first wavelength, such that a second excitation source module of the from one to three additional excitation source modules comprises a second laser that emits light at a second wavelength, and such that the first wavelength is different from the second wavelength.

In any of the embodiments described herein, a modular particle analyzer may further comprise an externally adjustable fine alignment module configured to adjust the propagation direction of the first substantially collimated light beam.

In any of the embodiments described herein, a modular particle analyzer may further comprise an obscuration mask and a forward scatter photodetector, such that the obscuration mask is coupled to a translation stage and configured to block unwanted light from the flowcell. In any of the embodiments described herein, the obscuration mask may include a relay lens and one or more elements configured to block unwanted light from the flowcell. In any of the embodiments described herein, the relay lens may be coupled to a translation stage. The translation stage is configured to adjust the transversal position (in both x and y) of the obscuration mask so as to substantially block undesired laser and scattered light and so as to substantially transmit desired particle-scattered light. In some embodiments, the relay lens of the obscuration mask is configured to relay desired scattered light from a particle in the flowcell onto an active surface of the forward scatter photodetector.

In any of the embodiments described herein, a modular particle analyzer may further comprise from one to six additional detection modules, each comprising an additional dichroic beamsplitter and an additional photodetector; and a rod-and-cage architecture, such that each of the additional dichroic beamsplitters is coupled to a kinematic cage cube insert. In any of the embodiments described herein, each of the kinematic cage cube insert may optionally be magnetically coupled to a corresponding base.

In any of the embodiments described herein, the first detection module and the additional detection modules each may further comprise a spectral filter coupled to a cage filter holder.

In any of the embodiments described herein, a modular particle analyzer may further comprise a microscope configured to monitor the sample in the flowcell. In some embodiments, the microscope may further comprise an externally controllable focusing element configured to monitor the sample in the flowcell.

In any of the embodiments described herein, a modular particle analyzer may further comprise: a polarizer or a filter located between the flowcell and the microscope; a side-scatter photodetector; and a longpass beamsplitter located between the flowcell and the microscope, such that the longpass beamsplitter is configured to reflect scattered light from the sample to the side-scatter photodetector.

Another aspect of the present disclosure is directed to a modular particle analyzer, comprising: a rod-and-cage architecture; from two to four excitation source modules each configured to output a substantially collimated light beam; from one to three beam combiners configured to combine the substantially collimated light beams from the each of the excitation source modules into a combined substantially collimated light beam, such that the beam combiners are each coupled to a kinematic mount; a flowcell configured to receive a sample therethrough, such that the sample is illuminated by the substantially combined collimated light beam when in the flowcell; a collimating lens configured to substantially collimate light emitted from the flowcell; and from one to seven detection modules, each comprising a dichroic beamsplitter and a photodetector.

In some embodiments, each of the dichroic beamsplitters is coupled to a kinematic cage cube insert. In some embodiments, each dichroic beamsplitter is configured to separate light output from the collimating lens into additional substantially collimated light beams. In some embodiments, the additional substantially collimated light beams are detected by the photodetectors.

In any of the embodiments described herein, a modular particle analyzer may further comprise an externally adjustable fine alignment module configured to adjust the propagation direction of the combined substantially collimated light beam.

In any of the embodiments described herein, a modular particle analyzer may further comprise a stray light blocking module comprising a focusing lens, a pinhole, and a collimating lens, such that the focusing lens is configured to focus light emitted from the flowcell through the pinhole. In some embodiments, the pinhole is configured to block stray or scattered light emitted from the flowcell. In some embodiments, the collimating lens is configured to substantially collimate the light exiting the pinhole.

In any of the embodiments described herein, a modular particle analyzer may further comprise an obscuration mask and a forward scatter photodetector, such that the obscuration mask is coupled to a translation stage and configured to block unwanted light from the flowcell. In some embodiments, the obscuration mask comprises a relay lens and one or more elements, such that the relay lens is configured to block unwanted light from the flowcell. In some embodiments, the relay lens may be coupled to a translation stage. In some embodiments, the relay lens of the obscuration mask is configured to relay desired scattered light from a particle in the flowcell onto an active surface of the forward scatter photodetector.

In any of the embodiments described herein, the detection modules each may further comprise a spectral filter coupled to a cage filter holder.

In any of the embodiments described herein, a modular particle analyzer may further comprise a microscope configured to monitor the sample in the flowcell. In some embodiments, the microscope may further comprise an externally controllable focusing element configured to monitor the sample in the flowcell.

In any of the embodiments described herein, a modular particle analyzer may further comprise: a polarizer or a filter located between the flowcell and the microscope; a side-scatter photodetector; and a longpass beamsplitter located between the flowcell and the microscope, such that the longpass beamsplitter is configured to reflect scattered light from the sample to the side-scatter photodetector.

In any of the embodiments described herein, a first excitation source module of the from two to four excitation source modules comprises a first laser that emits light at a first wavelength, such that a second excitation source module of the from two to four excitation source modules comprises a second laser that emits light at a second wavelength, and such that the first wavelength is different from the second wavelength.

Another aspect of the present disclosure is directed to a flow cytometry apparatus, comprising: a flowcell; a sheath pressure control module comprising a sheath tank, the sheath tank comprising a sheath fluid or other fluid and a fluid output coupled to a first input of the flowcell, the sheath pressure control module being configured such that pressurized sheath fluid or other fluid in the sheath tank is conveyed through the fluid output to and into the flowcell; a sample pressure control module comprising a sample pressure vessel, the sample pressure vessel comprising air or other gas and an output coupled to a second input of the flowcell connected to a pressurizable sampling port, the sample pressure control module being configured such that pressurized air or other gas in the sample pressure vessel is conveyed to the sampling port and pushes the sample from a sample tube coupled to the sampling port through a sample probe in the sampling port into the flowcell; and a set of valves configured to control the flow of the sheath fluid or other fluid and the flow of the sample to the flowcell.

Another aspect of the present disclosure is directed to a flow cytometry apparatus, comprising: a flowcell; a sheath pressure control module comprising: a first pump; a first regulator downstream from the first pump; a second regulator downstream from the first regulator; a sheath tank downstream from the second regulator, such that the sheath tank comprises a sheath fluid and a sheath fluid output coupled to a first input of the flowcell; and a first pressure gauge configured to monitor the pressure between the second regulator and the sheath tank; a sample pressure control module comprising a sample pressure vessel, such that the sample pressure vessel comprises a gas and an output coupled to a sampling port connected to the flowcell; and a set of valves configured to control the flow of the sheath fluid to the flowcell, the pressure of the gas, and the flow of a sample from a sample container through a probe of the sampling port to the flowcell.

In any of the embodiments described herein, the sheath pressure control module may further comprise: a first pump; a first regulator downstream from the first pump; a second regulator downstream from the first regulator and upstream from the sheath thank; and a first pressure gauge configured to monitor the pressure between the second regulator and the sheath tank.

In any of the embodiments described herein, the sample pressure control module may further comprise: a second pump; a third regulator downstream from the second pump; a fourth regulator downstream from the third regulator and upstream from the sample pressure vessel; and a second pressure gauge configured to monitor the pressure between the fourth regulator and the sample pressure vessel.

In any of the embodiments described herein, the first, second, third, and fourth regulators, and the set of valves are configured to adjustably control the flow rate of the sheath fluid into the flowcell and the flow rate of the sample into the flowcell.

In any of the embodiments described herein, the first pressure regulator is set between about 15 psi and about 50 psi, and such that the third pressure regulator is set between about 15 psi and about 50 psi.

In any of the embodiments described herein, the flow rate of the sample through the flowcell is between about 0.3 µL/min and about 120 µL/min.

In any of the embodiments described herein, a flow cytometry apparatus may further comprise a sample boost module comprising: a boost valve located between the sheath tank and the flowcell, such that the boost valve has a boost valve output coupled to the first input of the flowcell; a sample boost control switch coupled to the boost valve, such that the sample boost control switch is configured to control the boost valve; and a flow restrictor in parallel with the boost valve, such that the flow restrictor is configured to reduce the pressure of the sheath fluid input into the flowcell when the boost valve is closed by the sample boost control switch.

In any of the embodiments described herein, the flow restrictor is configured to reduce the pressure of the sheath fluid input into the flowcell by between about 20% and about 50% when the boost valve is closed.

In any of the embodiments described herein, the flow restrictor is configured to reduce the minimum sample pressure threshold to input the sample into the flowcell by between about 1 psi and about 5 psi when the boost valve is closed.

Another aspect of the present disclosure is directed to a flow cytometry apparatus, comprising: a flowcell; a first sheath fluid line coupling a sheath fluid tank to a first input of the flowcell, such that the first sheath fluid line is configured to input a sheath fluid into the flowcell; a sample probe assembly coupled to a second input of the flowcell, such that the sample probe assembly comprises a sample probe configured to input a sample (e.g., comprising one or more particle for analysis) into the flowcell; a second sheath fluid line coupling the sheath fluid tank to the sample probe assembly; a valve on the second sheath fluid line, such that the sample probe assembly, the second sheath fluid line, and the valve are configured to flow the sheath fluid through the sample probe assembly when the valve is open; and a receptacle configured to accept the sheath fluid after flowing through the sample probe assembly.

In any of the embodiments described herein, a flow cytometry apparatus may further comprise a probe wash tube, such that the probe wash tube surrounds a portion of the sample probe, and the sample probe assembly, the sample wash tube, the second sheath fluid line, and the valve are configured to flow the sheath fluid through a space between the sample probe and the probe wash tube when the valve is open.

BRIEF DESCRIPTION OF THE DRAWINGS

The foregoing is a summary, and thus, necessarily limited in detail. The above-mentioned aspects, as well as other aspects, features, and advantages of the present technology are described below in connection with various embodiments, with reference made to the accompanying drawings.

FIG. 3C shows a table of various modes, each involving a different pattern of open and closed valves 301-307 to produce the desired combination of pressures and fluid flows.

Figure 1:
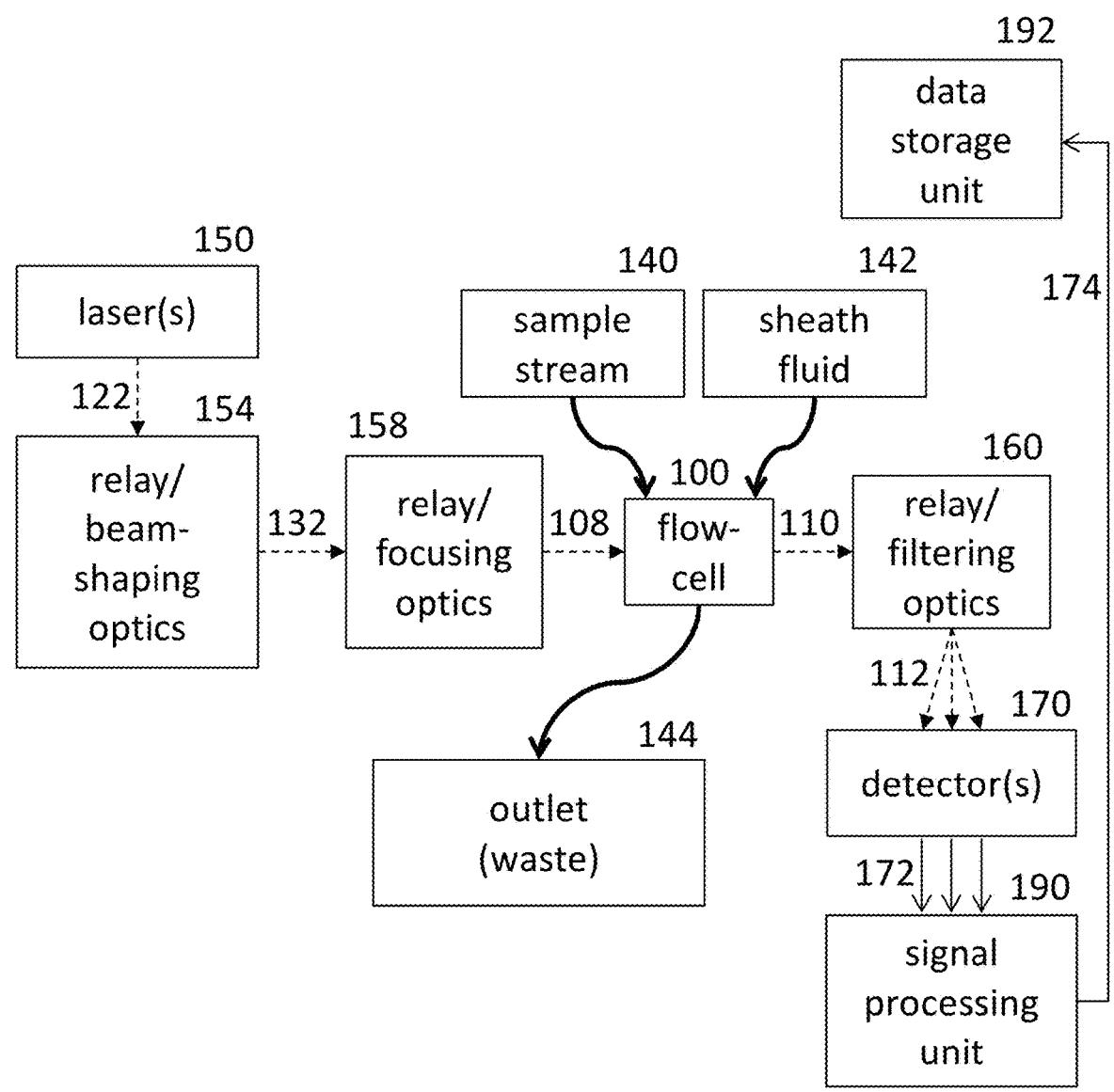
FIG. 1 is a schematic illustration of a system configuration of an apparatus for analysis of single particles in a sample in accordance with some embodiments.

The illustrated embodiments are merely examples and are not intended to limit the disclosure. The schematics are drawn to illustrate features and concepts and are not necessarily drawn to scale.

DETAILED DESCRIPTION

The foregoing is a summary, and thus, necessarily limited in detail. The above-mentioned aspects, as well as other aspects, features, and advantages of the present technology will now be described in connection with various embodiments. The inclusion of the following embodiments is not intended to limit the disclosure to these embodiments, but rather to enable any person skilled in the art to make and use the contemplated invention(s). Other embodiments may be utilized, and modifications may be made without departing from the spirit or scope of the subject matter presented herein. Aspects of the disclosure, as described and illustrated herein, can be arranged, combined, modified, and designed in a variety of different formulations, all of which are explicitly contemplated and form part of this disclosure.

As used herein, the term "sample" refers to a liquid sample, a fluid sample, a solution comprising, e.g., sample material dissolved into a fluid, a sample suspension comprising, e.g., sample particles, solids, and/or other insoluble matter suspended in a fluid, a sample slurry comprising, e.g., a mixture of different sample particles, solids, and/or other insoluble matter suspended in a fluid, a multiphase material comprising sample solids and fluids, and other compositions or arrangements of matter that can be flowed, either of themselves or as solutions, suspensions, dispersions, slurries, or other configurations.

The invention is directed to a configurable flow cytometry apparatus and methods of operating a configurable flow cytometry apparatus. In some embodiments, a configurable, or modular, flow cytometry apparatus includes one or more excitation modules that output light, a flowcell containing a sample that is illuminated by the light from the excitation module(s), and one or more detection modules (e.g., 1-5, 1-10, 5-50, 10-100, 1-100, 1-7, 1-6, 1-40, 1-50, etc.) that detect light (e.g., without limitation, scattered and fluorescent light) emitted from the sample. The flow cytometry apparatus may, additionally, include one or more optics modules, such as relay, beam shaping, and/or focusing optics module(s) between the excitation source module(s) and the flowcell, and/or relay, stray light blocking, and/or filtering optics modules between the flowcell and the detector module(s). In some cases, the flow cytometry apparatus may also include a microscope (e.g., an externally focusable microscope) configured to monitor samples within the flowcell. In some embodiments, the excitation module(s), the detection module(s), and/or the optics module(s) are configurable. For example, the flow cytometry apparatus may include a rod-and-cage architecture, where the excitation module(s), the detection module(s), and/or the optics module(s) are coupled to optionally magnetic kinematic mounts that enable the modules to be removed and reinserted.

In some embodiments, the configurable or modular flow cytometry apparatuses and methods described herein include a pneumatic and fluidic control architecture that controls the rate of flow of a sample and the transit time of a sample through an interrogation region of a flowcell. In some cases, the pneumatic and fluidic control architecture also enables the flow cytometry apparatus to operate in different modes, such as a run mode, a backflush mode, a fill mode, a drain mode, and a standby mode, as described herein (e.g., FIG. 3C).

The configurable or modular flow cytometry apparatuses and methods described herein can be used in various applications, where some non-limiting examples include the analysis of particle samples; the analysis of cellular samples; the analysis of microbiological samples; the analysis of samples of milk, beer, wine, and other food-grade fluids; industrial inline process control; and water quality monitoring. The configurable or modular flow cytometry apparatuses and methods described herein can be used to analyze various samples, where some non-limiting examples include cells (such as, without limitation, human cells, animal cells, plant cells, bacteria, algae, fungi, and other microorganisms), other organic particles (such as, without limitation, viruses, microvesicles, extracellular vesicles, and exosomes), inorganic particles (such as, without limitation, nanoparticles, microparticles, quantum dots, microdroplets, and particles found in emulsions, suspensions, aerosols), and compounds in liquid solutions (e.g., without limitation, proteins, enzymes, macromolecules, lipids, sugars, chemical species, chemical compounds, physical aggregates, and physico-chemically bound entities). In some embodiments, the configurable or modular flow cytometry apparatuses and methods described herein can be used to detect samples using label-free flow cytometry (i.e., without relying on added ("exogenous") fluorescent labels).

Cellular analysis and microbiological analysis have been in widespread use in life science research and medical diagnostics alike. Yet as certain applications become routine, new gaps emerge, exposing shortcomings and demanding better solutions.

One such area of unmet need is analysis of bacteria, algae, and other small particles. For example, in the fields of water quality monitoring and milk supply quality monitoring, it is desired to obtain results rapidly and inexpensively. Conventional techniques, such as culturing of samples, microscopy, and flow cytometry using fluorescent biochemical labels, can be slow and/or lack in statistical significance. It would be desirable to provide a way to rapidly perform sensitive flow cytometric analyses of particles or cells without having to rely on exogenous fluorescent labels.

The configurable or modular flow cytometry apparatuses and methods described herein can effectively excite and detect endogenous fluorescence on an analytical platform, so as to provide for simple and direct differentiation between cells belonging to different populations known to correlate with different values of endogenous fluorescence lifetime of one or more natively present compounds. The present systems and methods are configurable, and both the architecture and operating parameters of the analyzers described herein can be tailored to sensitively detect certain kinds of particles in a sample. Further, the architecture and operating parameters are able to be flexibly changed for different samples. Users (e.g., core laboratories, individual flow cytometrists, etc.) often need to analyze a wide variety of samples on a regular basis, and acquiring a different analyzer for each type of sample is cost-prohibitive and impractical. The present configurable or modular flow cytometry systems and methods describe a cell and particle analyzer (and use thereof) where the operating parameters can be varied by the user to suit a wide range of detection and characterization needs, and where the analyzer architecture itself can be easily tailored to reach otherwise inaccessible levels of performance.

FIG. 1 illustrates schematically a configurable or modular flow cytometry system configuration of an embodiment of the present disclosure, which provides a modular and/or adjustable apparatus for sensitive particle analysis in a sample. One or more light source modules 150, e.g., a laser, produce one or more optical energy (light) beams 122 with desired wavelength, power, dimensions, and cross-sectional characteristics. The beam(s) are optionally directed to a set of relay optics 154 (which can include, without limitation, lenses, mirrors, prisms, or optical fibers), which may additionally and/or optionally perform a beam-shaping function. Here relay optics will be intended to represent means to transmit one or more beams from one point in the system to another, and will also be intended to represent means to shape one or more beams in terms of dimensions and convergence, divergence, or collimation. The output beam(s) 132 from the beam-shaping relay optics are optionally directed to another optional set of relay optics 158 (which can include, without limitation, lenses, mirrors, prisms, or optical fibers), which may additionally and/or optionally perform a focusing function. The relay/beam-shaping optics 154, the relay/focusing optics 158, or both, may alternatively be incorporated into the light source module 150, or may alternatively be made unnecessary by suitably prescribed beam characteristics from the light source module 150, such as, e.g., without limitation, suitable beam dimensions, a suitably elliptical beam cross-section profile, and/or suitably convergent beam properties, as further described herein. The combined effect of the two sets of relay optics 154 and 158 (or corresponding elements in alternative embodiments as described herein) upon the input beam(s) from the light source(s) is to impart upon the beam(s) the desired output beam propagation characteristics suitable for interrogating particles. The second set of relay optics 158 then directs the beam(s) 108 to the flowcell 100. The flowcell 100 provides for the passage of particles to be analyzed (which can include, without limitation, cells, bacteria, exosomes, liposomes, microvesicles, microparticles, nanoparticles, and natural or synthetic microspheres) by conveying a sample stream 140 containing said particles as a suspension, and a stream of sheath fluid 142 that surrounds and confines said sample stream, as further described herein. An input portion of the flowcell focuses, e.g., by hydrodynamic means, the sample stream and the surrounding sheath stream to result in a sample core stream flowing through a microchannel portion of the flowcell, surrounded by sheath fluid. The sheath-fluid-surrounded sample core stream flowing past the interrogation region of the flowcell typically exposes, on average, less than one particle at a time to the beam or beams for interrogation (this is sometimes referred to in the art as "cell-by-single-cell" or "particle-by-single-particle" interrogation). In the example shown in FIG. 1, the sheath fluid and the sample core stream are directed to a single outlet 144 (and generally discarded as waste) after passage through the interrogation portion of the flowcell. As the interrogating beam(s) of optical energy (light) interact with particles in the sample core stream by scattering, absorption, fluorescence, and other means, optical signals 110 are generated. These optical signals can be collected by relay optics in module 160 (which can include, without limitation, single lenses, doublet lenses, multi-lens elements, mirrors, prisms, optical fibers, or waveguides) positioned around the flowcell. The relay optics can then convey the optical signals to filtering optics in module 160 (which can include, without limitation, colored filters, dichroic filters, dichroic beamsplitters, bandpass filters, longpass filters, shortpass filters, multiband filters, diffraction gratings, prisms, or holographic optical elements), and then the filtered light signals 112 can be conveyed by optional further relay optics in module 160 to one or more detectors 170 (which can include, without limitation, photodiodes, avalanche photodiodes, photomultiplier tubes, silicon photomultipliers, or avalanche photodiode microcell arrays). The detectors convert the optical signals 112 into electronic signals 172, which are optionally further amplified and groomed to reduce the impact of unwanted noise. The electronic signals are sent to an electronic signal processing unit 190 which executes further processing steps upon the electronic signals. The electronic signal processing unit 190 may comprise a digitization front end with an analog-to-digital converter for each signal stream, as well as discrete analog and digital filter units, and also may comprise one or more of a Field-Programmable Gate Array (FPGA) chip or module; a Digital Signal Processing (DSP) chip or module; an Application-Specific Integrated Circuit (ASIC) chip or module; a single-core or multi-core Central Processing Unit (CPU); a microprocessor; a microcontroller; a standalone computer; and a remote processor located on a "digital cloud"-based server and accessed through data network or wired or cellular telephony means. The processed signals 174 can then be sent to a data storage unit 192 (which can include, without limitation, a read-only memory unit, a flash memory unit, a hard-disk drive, an optical storage unit, an external storage unit, or a remote or virtual storage unit connected to the instrument by means of a wired data or telecommunication network, a Wi-Fi link, an infrared communication link, or a cellular telephony network link). The stored or preliminarily processed data, or both, can also be made available to an operator for optional inspection of results.

Figure 2:
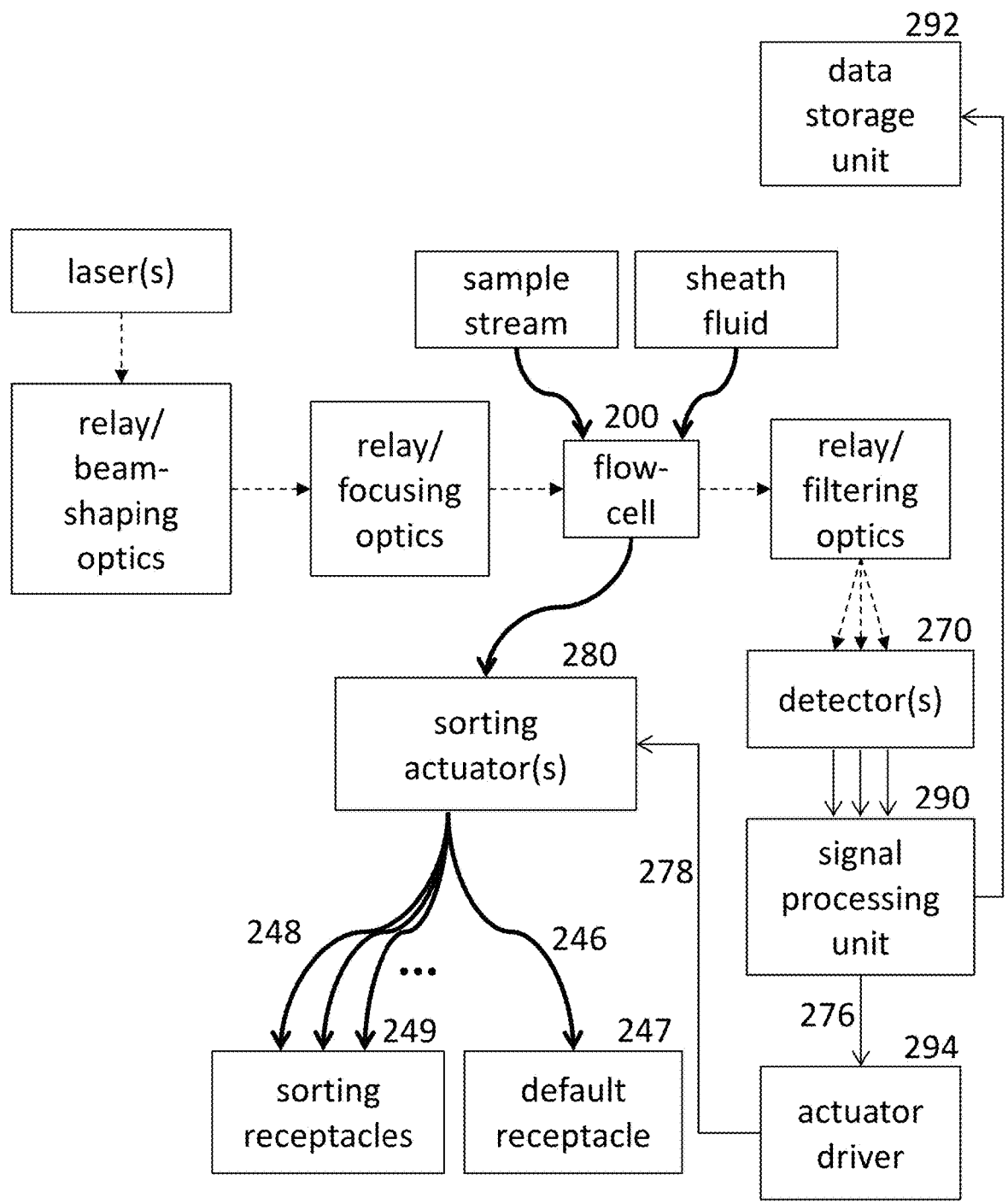
FIG. 2 is a schematic illustration of a system configuration of an apparatus for analysis and sorting of single particles in a sample in accordance with some embodiments.

FIG. 2 illustrates schematically a system configuration of another exemplary embodiment of the configurable or modular flow cytometry systems of the present disclosure, which provides a modular and/or adjustable apparatus for sensitive analysis and/or sorting of particles in a sample. It is similar in configuration to the system configuration of FIG. 1, except in that it additionally provides for the capability to sort and collect particles based on their detected characteristics. The signal processing unit 290 generates in real time sorting control signals 276 based on the detected presence or absence or degree or nature of predetermined characteristics of the particles to be analyzed, detected by detector(s) 270. For example, it may be desirable to identify and sort particles that, upon excitation by the interrogating light beam(s), emit fluorescence in a predefined spectral band at a level above a predefined threshold. As another example, it may be desirable to identify and sort particles that, upon excitation by the interrogating beam(s), exhibit scattering in a certain range of values and/or at a percentage above a predefined threshold. Different criteria may be used in isolation or combined in compound logical forms (such as AND, OR, NOT, as well as more complex forms involving numerical comparisons of different quantities, such as, without limitation, "greater than," "less than," and so forth). The signal processing unit 290, once the processed signals from a given particle meet the predefined set of sorting criteria, can trigger a signal 276 conveyed to an optional actuator driver 294. The actuator driver 294 is an electronic control module connected to one or more sorting actuators 280. In an alternative embodiment, the trigger signal 276 generated by signal processing unit 290 can be conveyed directly to the one or more sorting actuators 280. The sorting actuators 280 may be positioned in, on, next to, or near the flowcell 200 in the vicinity of, and downstream from, the interrogation region. One or more of the sorting actuators 280 is temporarily activated by drive signal 278 from the actuator driver 294 in response to the triggering signal 276 from the processing unit 290, resulting in a temporary diversion of the sample core stream, or of a portion of the sample core stream, away from the default sorting channel 246 and into one or more sorting channels 248. Alternatively, the sorting actuator(s) are temporarily activated by the trigger signal 276 from the processing unit 290, resulting in a temporary diversion of the sample core stream, or of a portion of the sample core stream, away from the default sorting channel 246 and into one or more sorting channels 248. The default sorting channel 246 optionally directs the fluids it receives into a default receptacle 247. The sorting channel(s) 248 direct the sample core stream, in turn, to respective receiving sorting receptacle(s) 249. Once the temporary activation of one or more of the sorting actuators 280 is complete, the actuator(s) can return to their resting state, and the sample core stream can return to its default sorting channel 246. The sorting actuator(s) 280 can be controllable to achieve multiple actuation states, including, without limitation, using an actuator driver 294, using a built-in control, using direct voltage or current control from the processing unit 290, or using electrical signals coming directly from logic circuitry connected with the one or more detectors 270.

Figure 3A:
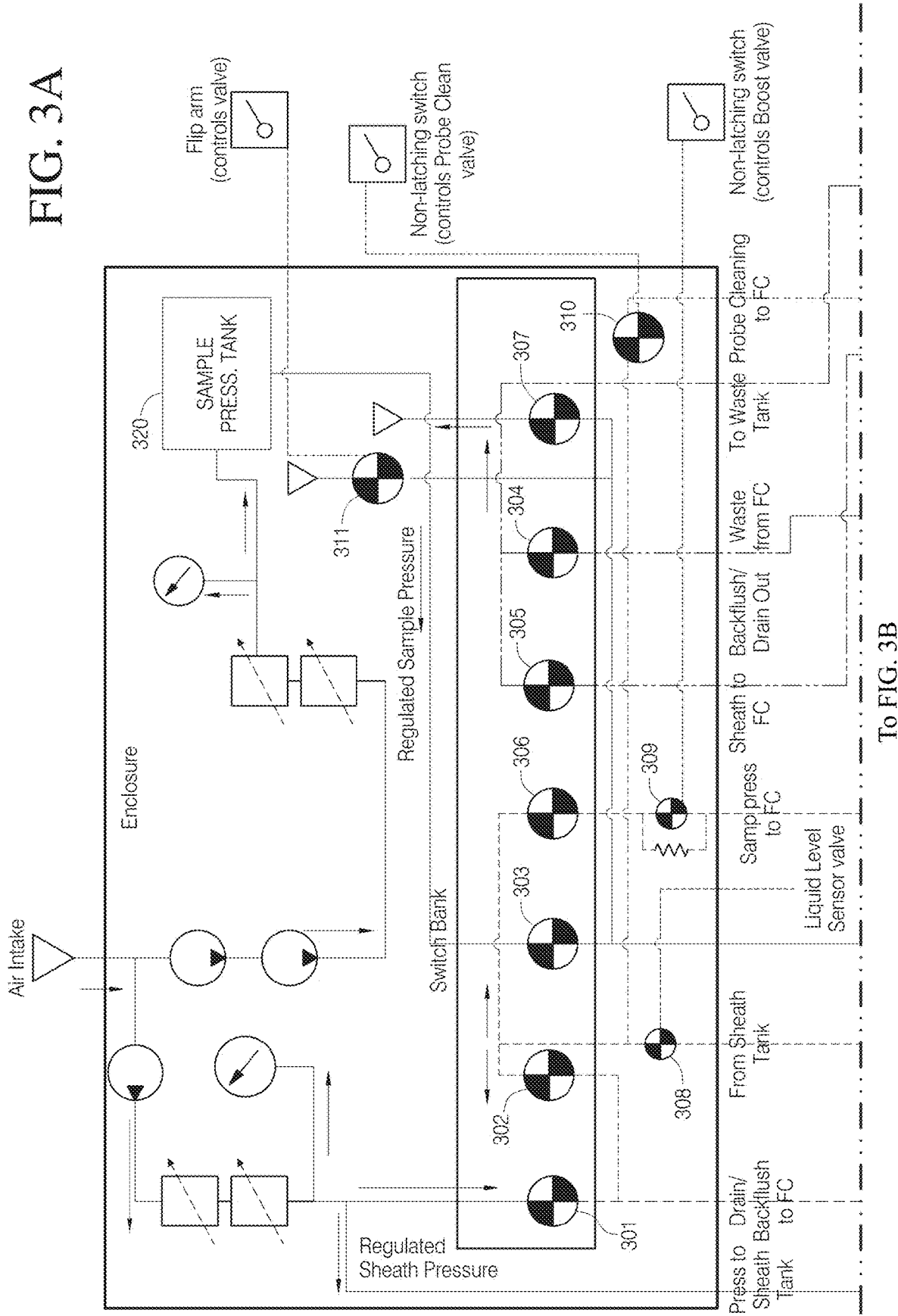
FIG. 3A is a first portion of a schematic illustration of a flow-control architecture of an apparatus in accordance with some embodiments.
Figure 3B:
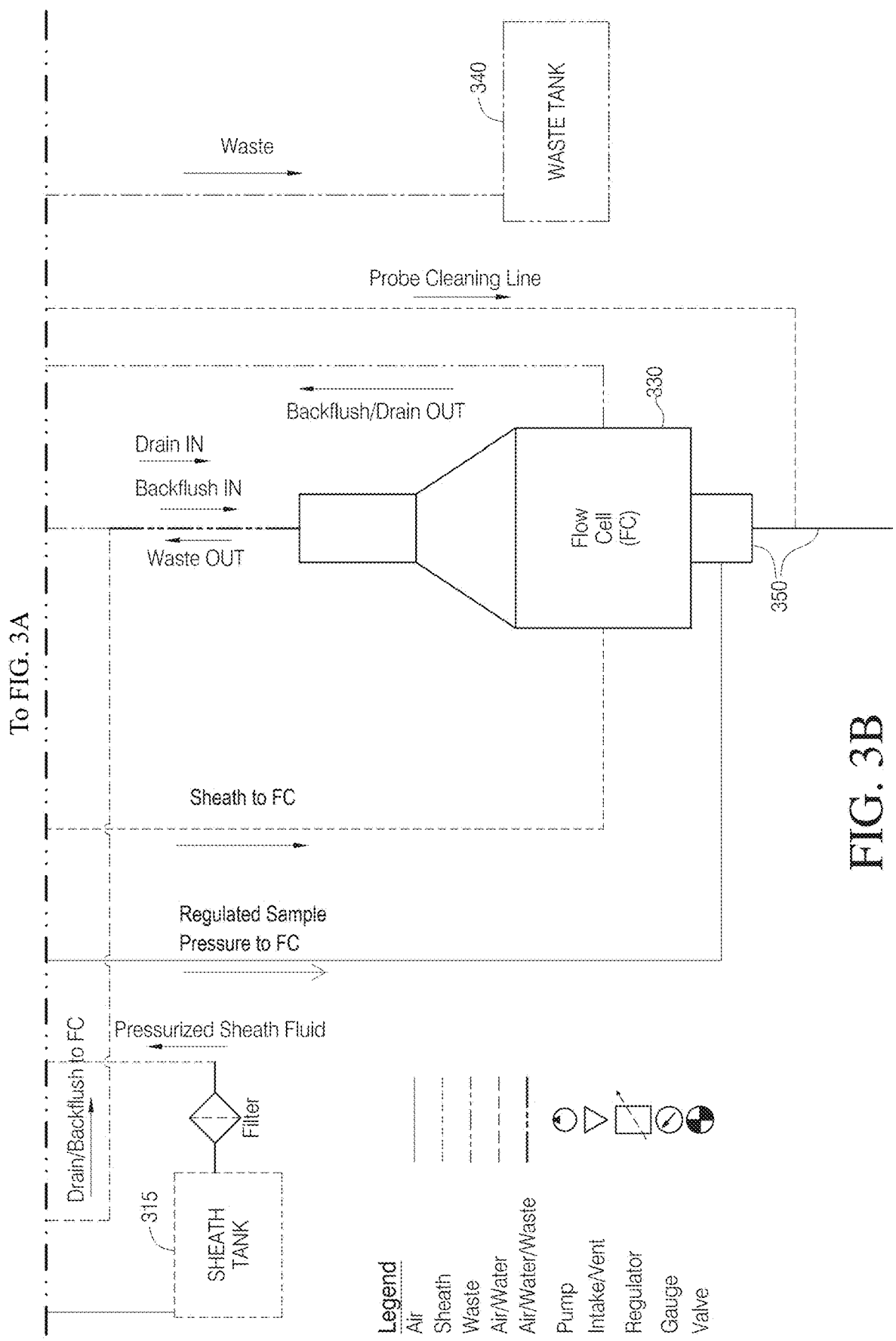
FIG. 3B is a second portion of a schematic illustration of a flow-control architecture of an apparatus in accordance with some embodiments.

FIGS. 3A-3B are a schematic illustration of the pneumatic and fluidic control system architecture of a configurable or modular flow cytometry apparatus in accordance with some embodiments of the present disclosure. A purpose of the pneumatic and fluidic control modules depicted in FIGS. 3A-3B is to provide hydrodynamic focusing of the sample stream so as to present, generally, only single particles to the laser beams for interrogation, and to prevent the sample suspension from contacting the flowcell walls. Hydrodynamic focusing involves injecting sample and sheath fluids concentrically and forcing them through a constriction in the two transversal dimensions to produce a narrow sample stream having, on average, only one sample particle in (each) interrogation region. The architecture illustrated in FIGS. 3A-3B achieves hydrodynamic focusing by providing two separate hydrostatic pressure control modules-one for the sheath fluid and one for the sample. Each module is described in greater detail below.

The pneumatic/fluidic control subsystem shown in FIGS. 3A-3B contains several valves 301-307 and is designed to operate in several modes, as shown in FIG. 3C. Each mode involves a different pattern of open and closed valves 301-307 to produce the desired combination of pressures and fluid flows; the patterns for the various modes are shown in FIG. 3C.

Figure 6:
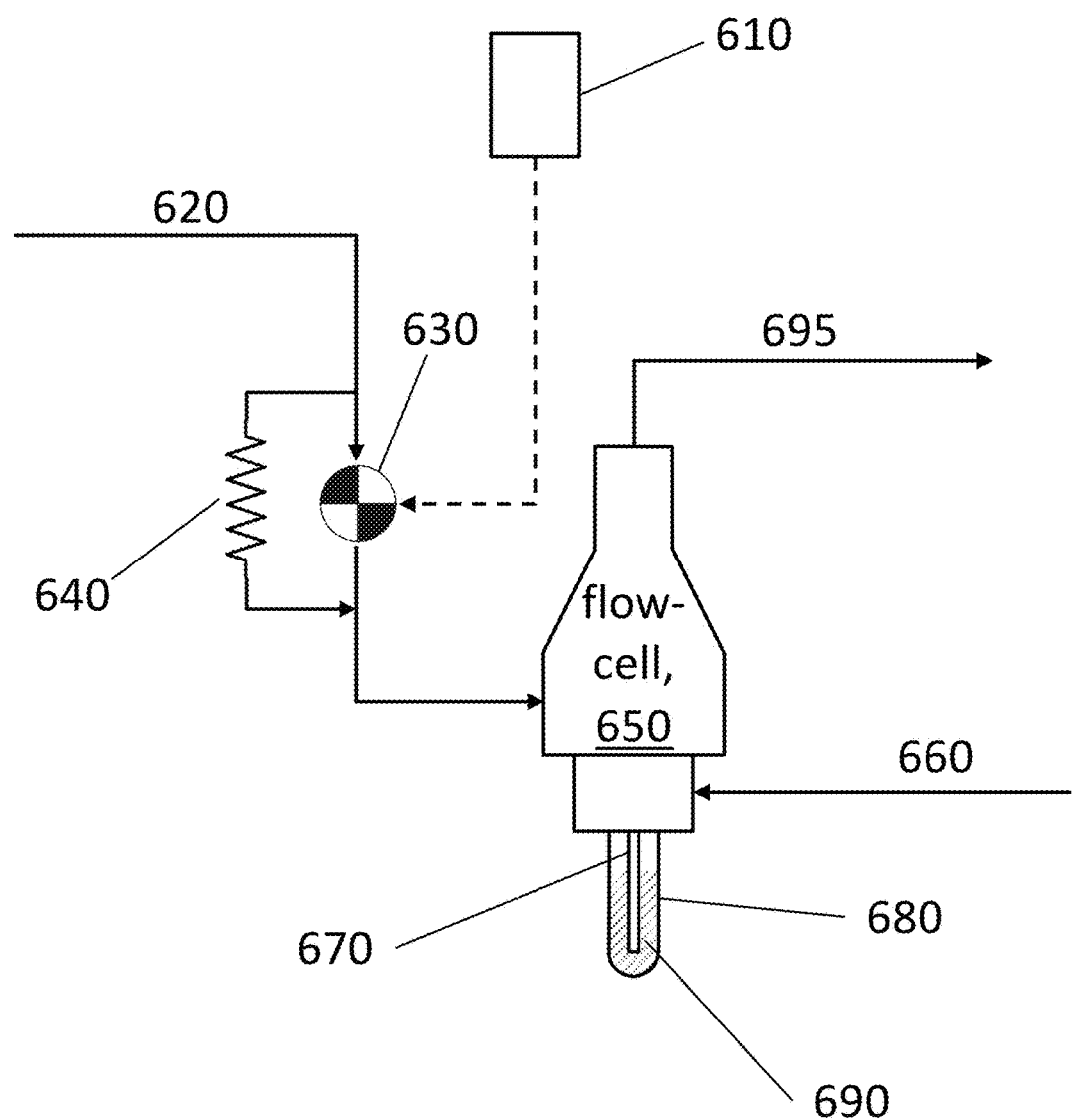
FIG. 6 is schematic illustration of a sample boost module of an apparatus in accordance with some embodiments.

The mode of operation used for measurement of the sample ("Run") provides for the sheath fluid (in the "sheath tank" 315) to be injected through valve 306 into the flowcell 330, and for a sample (in a sample tube placed around the sample port 350 under flowcell 330, as further illustrated in FIG. 6, and pressurized by the "sample press. tank" 320) to be simultaneously forced through the sample probe and injected into the flowcell 330, so as to produce hydrodynamic focusing of the sample stream. After particles in the sample traverse the interrogation region(s) of the laser beam(s) (not shown), the fluids are directed to the "waste tank" 340 (through valve 304). The "Backflush" mode allows sheath fluid to flow in reverse direction through the flowcell 330 to help eliminate possible clogs. The "Fill" mode allows filling of an empty flowcell 330. The "Drain" mode forces air into the flowcell 330 to remove fluids therefrom. The "Standby" mode stops all fluid flows and vents the sample pressure line. In some embodiments, the "Fill" mode is not present, and filling of the empty flowcell 330 can be achieved using the "Run" mode without presenting a sample to the sample probe, the "Backflush" mode, or a combination of the "Backflush" and "Run" modes.

Actuation of valves 301-307 is effected through any number of means known in the art, including, without limitation, manual actuation of individual stop valves, joint actuation of multiple valves (such as, e.g., by a multi-position selector switch simultaneously controlling all seven valves), electronic actuation of individual valves (such as, e.g., rocker valves or solenoid valves), and pilot actuation of individual valves (e.g., using pneumatically-controlled pinch valves in combination with solenoid valves). Different types of valves may be more suitable for different applications, according, e.g., without limitation, to their size, pressure rating, dead volume, wetted materials, reliability, and/or (for electrically operated valves) power consumption and switching speeds.

The pneumatic/fluidic control subsystem shown in FIGS. 3A-3B contains several additional valves 308-311. Valve 308 is connected to a sensor configured to sense the level of sheath fluid in the sheath tank 315, and the valve 308 is configured to close when the liquid level falls below a predetermined value. This can prevent the fluid system to aspirate air from the sheath tank and introduce unwanted bubbles in the fluid lines and into the flowcell. In another embodiment, valve 308 is connected to a sensor configured to sense the level of waste fluid in the waste tank 340, and the valve 308 is configured to close when the liquid level rises above a predetermined value. This can prevent the waste tank from overfilling and potentially causing fluid spillage. In another embodiment, valve 308 is connected to both a liquid level sensor in the sheath tank and a liquid level sensor in the waste tank, and is configured to close whenever either liquid level reaches a respective predetermined value as described above. Valve 309 is controlled by a boost switch, further described herein with reference to FIG. 6. Valve 310 is controlled by a probe cleaning switch, further described herein with reference to FIGS. 7-8. Valve 311 is connected on one side to the line that controls delivery of pressurized air to the sample tube, and on the other side to ambient air (venting). Valve 311 is controlled by a switch connected to a mechanical arm, indicated as "Flip arm" in FIG. 3A. The flip arm is positioned near the sample probe and is configured to move from a position under the sample probe to one or more positions not under the sample probe. When the flip arm is positioned under the sample probe, it acts to prevent the sample tube from being ejected from sampling port 350 by the sample pressure; in this position, valve 311 is configured to be closed, so that sample pressure can build up in the sampling port 350 and the sample tube to force the sample into the flowcell. Valve 311 is configured to be open when the flip arm is positioned other than under the sample probe, so that pressure in the sampling port 350 and the sample tube is vented to ambient air, preventing the sample tube from being ejected and preventing further aspiration of the sample into the flowcell.

Figure 4:
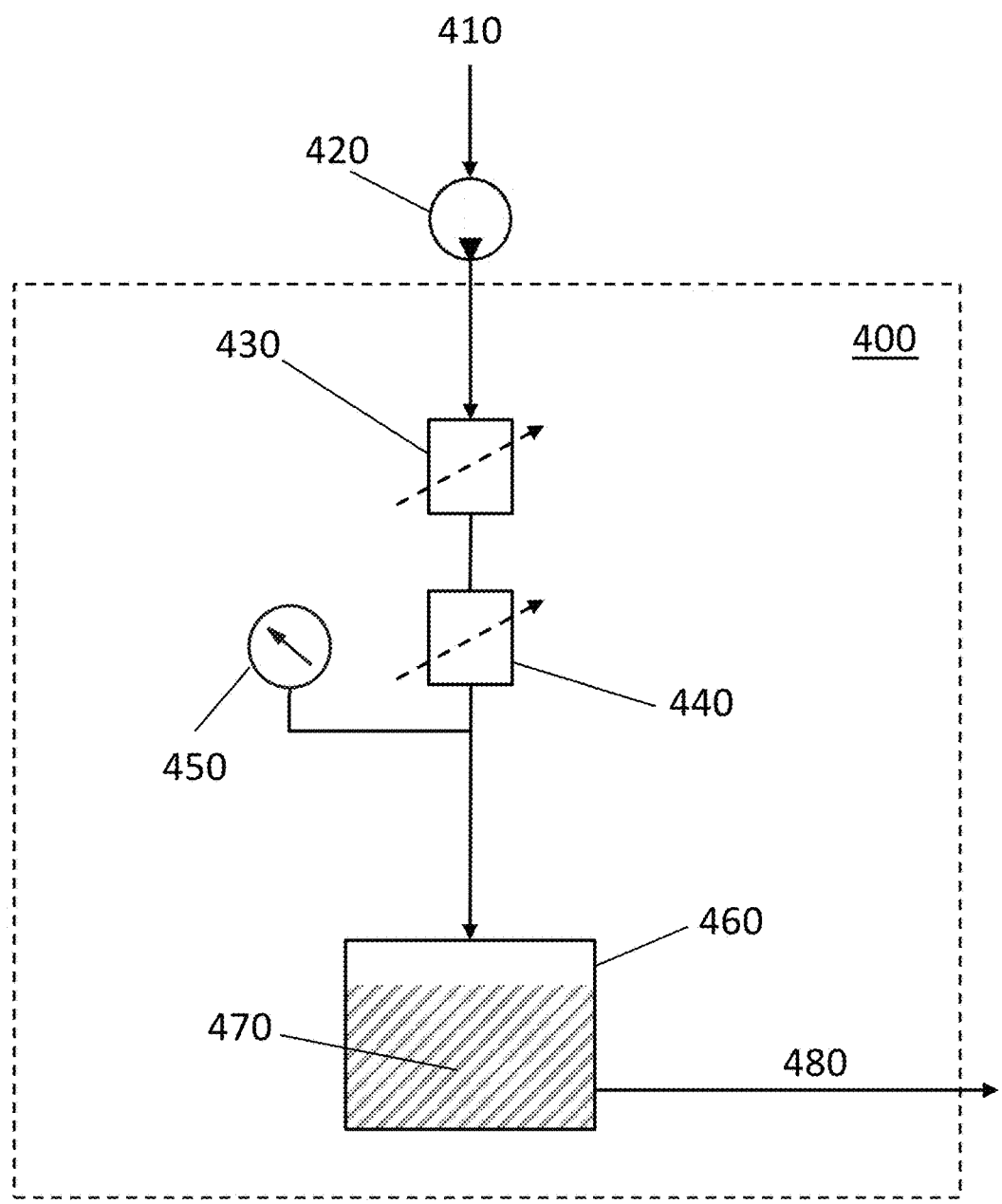
FIG. 4 is a schematic illustration of a continuously tunable sheath pressure module of an apparatus in accordance with some embodiments.

FIG. 4 schematically illustrates a configuration of a sheath pressure control module 400 for a configurable or modular flow cytometry system, in accordance with some embodiments of the present disclosure. A pump 420 (or optionally a set of two or more pumps, or a source of pressurized air) with an air intake 410 (which intake is optionally filtered to remove or reduce particulates and/or water vapor) conveys pressurized air to the module 400. Two regulators 430 and 440 connected in series provide successive layers of isolation to the downstream part of the circuit from possible pulsatile pressure fluctuations due to operation of the pump 420 or to system variations in the air source. The output of the second regulator 440 is read by a pressure gauge 450 used by the operator to monitor proper functioning of the module. This output pressurizes the sheath fluid tank 460, providing yet another layer of isolation between upstream fluctuations and downstream flow. The output of the sheath fluid tank 460 brings sheath fluid 470 through conduit 480 (and optionally through a sheath fluid filter, e.g., a 0.22-μm filter, as illustrated in FIG. 3B, to remove certain particulates suspended in the sheath fluid) to the flowcell for hydrodynamic focusing. Sheath fluid 470, under pressure in the sheath fluid tank 460, can also be used for filling and backflushing the flowcell, and/or to wash the sample probe (more details on washing the sample probe are described elsewhere herein). The first sheath pressure regulator 430 can be set (e.g., during manufacture) at a pressure level that prevents potential damage to the system (e.g., without limitation, a pressure between about 15 psi and about 50 psi, or in some embodiments a pressure lower than about 15 psi or greater than about 50 psi), while the second sheath pressure regulator 440 can be available for adjustment by the operator to achieve the desired sheath flow rate in the flowcell, and thereby achieve the desired average particle transit time (e.g., for a laser beam waist dimension in the flow direction of around 20 μm, without limitation, a transit time between abut 1 μs and about 20 μs, and in some embodiments a transit time shorter than about 1 μs or longer than about 20 μs or even longer than about 50 μs).

Figure 5:
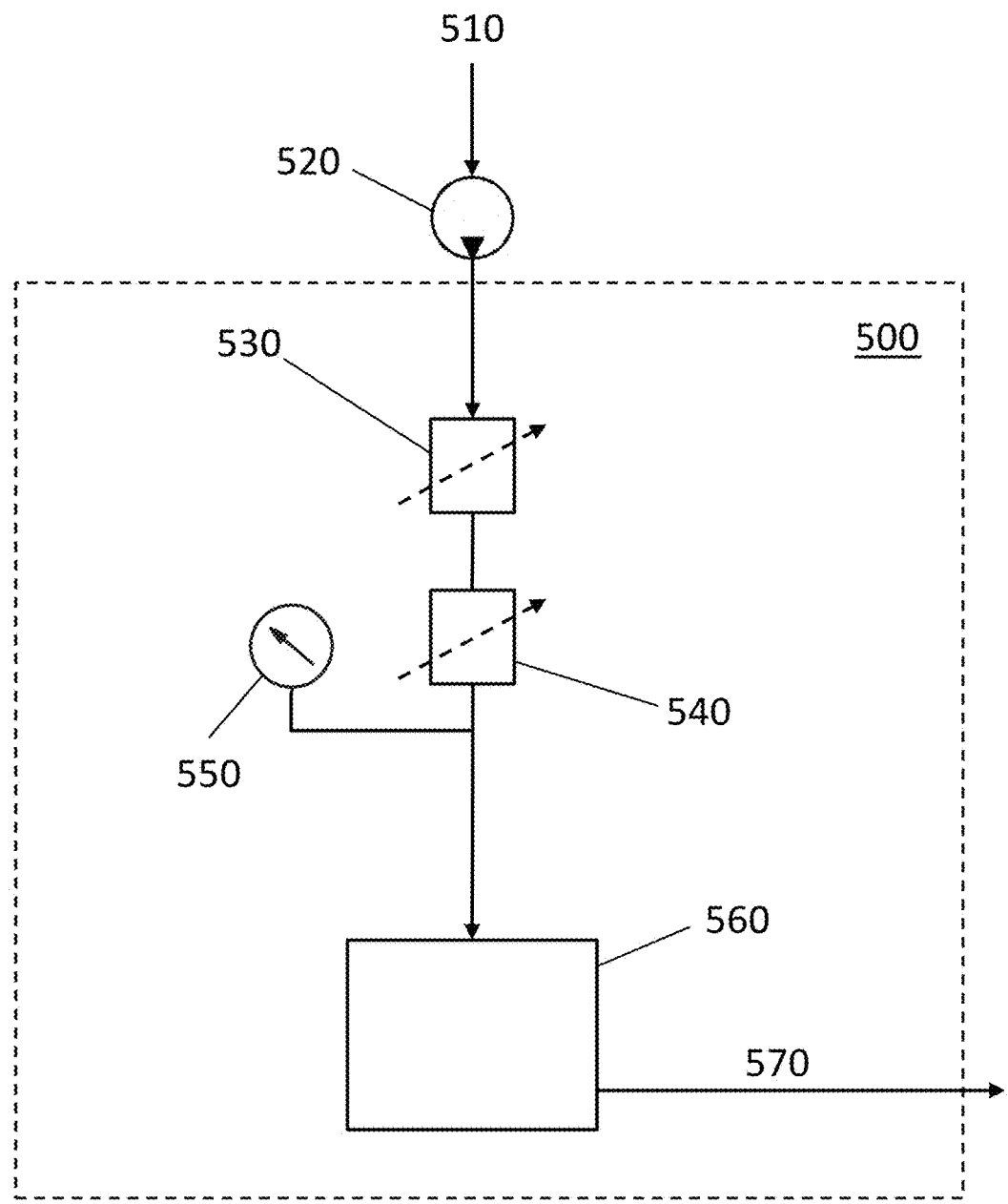
FIG. 5 is a schematic illustration of a continuously tunable sample pressure module of an apparatus in accordance with some embodiments.

FIG. 5 schematically illustrates a configuration of a sample pressure control module 500 of a configurable or modular flow cytometry system, in accordance with some embodiments of the present disclosure. A pump 520 (or optionally a set of two or more pumps, or a source of pressurized air) with an air intake 510 (which intake is optionally filtered to remove or reduce particulates and/or water vapor) conveys pressurized air to the module 500. Two regulators 530 and 540 connected in series provide successive layers of isolation to the downstream part of the circuit from possible pulsatile pressure fluctuations due to operation of the pump 520 or to system variations in the air source. The output of the second regulator 540 is read by a pressure gauge 550 used by the operator to monitor proper functioning of the module 500. This output pressurizes the sample pressure vessel 560, providing yet another layer of isolation between upstream fluctuations and downstream flow. The output 570 of the sample pressure vessel 560 pressurizes the sample tube in "Run" mode, impelling the sample suspension to traverse the sample probe and enter the flowcell to be hydrodynamically focused. The first sample pressure regulator 530 can be set (e.g., during manufacture) at a pressure level that prevents potential damage to the system (e.g., without limitation, a pressure between about 15 psi and about 50 psi, or in some embodiments a pressure lower than about 15 psi or greater than about 50 psi), while the second sample pressure regulator 540 can be available for adjustment by the operator to achieve the desired sample flow rate in the flowcell (e.g., without limitation, a sample flow rate of between about 15 μL/min and about 120 μL/min, between about 1.8 μL/min and about 15 μL/min, between about 0.3 μL/min and about 1.8 μL/min, between about 0.3 μL/min and about 120 μL/min, lower than about 0.3 μL/min, or greater than about 120 L/min), and thereby achieve the desired dimensions of the sample core stream and the rate at which sample particles in suspension are detected.

In some embodiments, the sheath module pump (e.g., 420 in FIG. 4) is separate from the sample module pump (e.g., 520 in FIG. 5). In another embodiment, the two modules 400 and 500 in FIGS. 4-5, respectively, share the same pump. In yet another embodiment, each module is served by two or more pumps connected in series, and in yet another embodiment, one module is served by one pump while the other is served by two or more. The choice among these embodiments is driven by considerations such as, without limitation, system pressure requirements and pump flow rate capacity, size, noise level, and/or cost.

FIG. 6 schematically illustrates a sample boost module of a configurable or modular flow cytometry apparatus, in accordance with some embodiments of the present disclosure. The boost module includes a sample boost control switch 610, a sheath fluid input 620, a valve 630, and a flow restrictor 640. For proper operation of the system in some embodiments, the sample pressure and the sheath pressure are in such relationship that pressurized air or other gas causes the sample to be injected into the sheath fluid flowing in the flowcell 650. Due to differences in hydrodynamic resistance in the paths that the sheath fluid and the sample take, the difference in pressure values as monitored by the gauges of the apparatuses described herein (e.g., shown in FIGS. 3, 4, and 5) does not necessarily correspond to the difference in sheath and sample pressures at the point of sample injection in the flowcell 650. However, under most operating conditions, for a given set sheath pressure (or sheath pressure at the point of sample injection in the flowcell 650), a minimum sample pressure can be found that results in sample injection into the flowcell 650. Increasing the sample pressure above this minimum threshold results in larger sample flow rates, and therefore comparatively larger sample core stream dimensions. This minimum threshold depends on the sheath pressure; the higher the set sheath pressure, the higher the minimum sample pressure needed to achieve sample injection.

In some cases, it is desirable to operate flow cytometers with the smallest achievable sample core stream dimensions. That can reduce the variability in measurement of the various quantities of interest (e.g., without limitation, light scattering, absorption, extinction, fluorescence). It also reduces the fraction of events subject to "coincidence," i.e., those instances where more than one particle simultaneously occupy the interrogation region. A sample core stream as small as practical can generally be achieved in two ways— by increasing the sheath pressure (e.g., depending on the hydrodynamic characteristics of the system, up to about 8 psi, up to about 10 psi, up to about 15 psi, or in some cases even greater than about 15 psi) or by decreasing the sample pressure (e.g., depending on the hydrodynamic characteristics of the system, down to about 5 psi, down to about 2 psi, down to about 1.5 psi, or in some cases even below about 1.5 psi). All other things being equal, changing the sheath pressure changes the flow rate. However, changing the flow rate also changes the average particle transit time, which can be undesirable. And decreasing the sample pressure beyond a minimum threshold described above stops the sample flow altogether, and in some cases can result in sheath fluid reversing flow through the sample probe 670 and backfilling the sample tube 680, thereby diluting and possibly contaminating the sample 690 itself. Therefore, it is often desirable to operate just above that minimum threshold.

In "Run" mode (as described above with respect to FIG. 3), the sample pressure line 660 is opened to drive the sample 690 through the flowcell 650. The pressure starts building up in the sample tube 680 once it is put in position around the sample probe 670 and the seal is formed. Over time, the sample pressure in the sample tube 680 builds up to the desired, set level, causing the sample 690 to be injected and the sample core stream to take on the desired dimensions. Under certain circumstances, however, and particularly when operating near the minimum threshold described above, reaching that steady state can take many seconds, and in some cases many tens of seconds. This is undesirable as it delays acquisition of measurements, and until the sample 690 starts flowing, backflowing sheath could dilute and contaminate the sample 690. The sample boost module illustrated in FIG. 6 provides a solution to this problem. Using switch 610, a valve 630 on the line carrying sheath fluid 620 to the flowcell is closed, forcing the sheath fluid 620 to take only an alternate path through a flow restrictor 640. Switch 610 may be, for example, without limitation, a two-position non-latching switch engaged by an operator after insertion of the sample tube 680 in the sampling port; or can be automatically engaged, for, e.g., a preset time, by a pressure sensor pneumatically connected to the sample pressure line 660 and positioned optionally relatively close to the sample probe 670 assembly, responding to the increase of pressure in the sample tube 680 following said insertion. The alternate path through flow restrictor 640 causes a drop in the sheath fluid pressure at the flowcell 650, which causes a drop in the minimum pressure threshold required for the sample 690 to be injected. By appropriately choosing the properties of the flow restrictor 640, the drop obtained in the minimum sample pressure can be such that, even in the early stages of pressure build-up in the sample tube 680, the sample pressure exceeds the new, temporarily lower minimum threshold. This causes the sample 690 to be injected into the flowcell 650 immediately or more quickly than the sample would be injected without the boost module (i.e., the sample injection receives a "boost"), instead of being subject to a delay while the sample pressure builds up. Once sample injection is stably established, the switch 610 can be released, returning the sheath pressure to its original higher value, returning the minimum sample pressure threshold to its original higher value, and causing the sample stream to reduce in size to the desired, steady-state, relatively small value desirable for minimum measurement variability.

In another embodiment, the characteristics of the sheath line flow restrictor 640 are chosen so as to cause a relatively larger drop (such as, without limitation, an about 20% drop, about 30% drop, about 50% drop, or between about 20% and about 50%, or greater than about 50%) in the sheath fluid pressure at the flowcell 650, and an attendant relatively larger drop in the minimum sample pressure threshold (e.g., without limitation, a drop of up to about 1 psi, a drop of up to about 5 psi, or between about 1 psi and about 5 psi, or in some cases a drop greater than about 5 psi). In such cases, the difference between the set sample pressure and the (new) minimum threshold therefore becomes relatively larger, resulting in relatively larger dimensions of the sample core stream (e.g., without limitation, up to about 100 μm, up to about 200 μm, up to about 300 μm, or even greater than about 300 μm in one linear cross-sectional dimension). With suitable choice of the flow restrictor 640 and operating parameters, the change in sample core stream dimensions can be large, reaching even a substantial fraction of the flowcell 650 cross-sectional dimensions, such as about 30%, about 50%, about 70%, or higher. This increase in the sample stream dimensions can be desirable in certain circumstances. In one application, when looking for rare (e.g., 1 in up to 100,000, or 1 event in up to 100 μL), very rare (e.g., 1 in up to 10,000,000, or 1 event in up to 10 mL), or extremely rare (e.g., 1 in up to 1,000,000,000 or more, or 1 event in up to 1 L or more) events, it may be advantageous to increase the sample flow rate as much as possible, in order to shorten the time it takes for the entire sample volume to be assayed. While normally increasing the sample stream cross-sectional dimensions to a substantial fraction of the flowcell cross-sectional dimensions is not desirable due to the greater variability of measurement in such instances, when performing assays to detect rare, very rare, or extremely rare events, such variability may be acceptable as a trade-off to a much shortened assay time. Additionally, in such cases, the variability in measurement can be mitigated by adopting optical interrogation architectures, e.g., those with substantially flat transversal beam profiles (called "flat-top" or "top-hat" profiles), thereby reducing or eliminating altogether the negative consequences of a larger sample stream with low abundance of events of interest.

Figure 7:
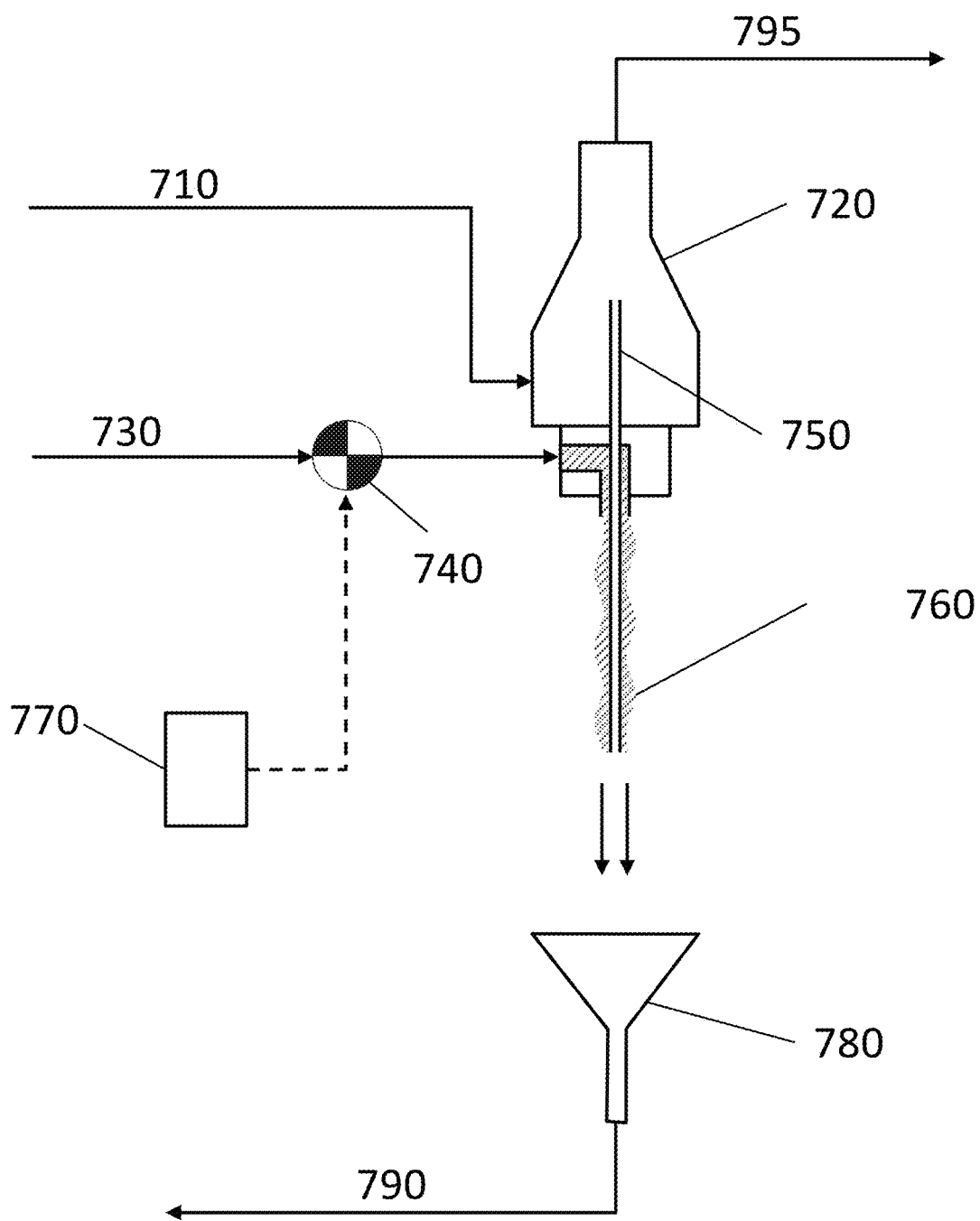
FIG. 7 is a schematic illustration of a sample probe wash module of an apparatus in accordance with some embodiments.

FIG. 7 illustrates a sample probe wash module of a configurable or modular flow cytometry apparatus, in accordance with some embodiments of the present disclosure. A line carrying sheath fluid 730 from the sheath tank (e.g., shown in FIGS. 3 and 4) is routed to a valve 740 controlled by a probe wash control switch 770. Sheath fluid line 730 in this example is separate from the sheath fluid line 710 used during the "Run" mode and can, therefore, be operated independently from it. Switch 770 can be, e.g., without limitation, a two-position non-latching switch engaged by an operator after removal of the sample tube in the sampling port. In other cases, switch 770 can be automatically engaged, for, e.g., a preset time, by a pressure sensor pneumatically connected to the sample pressure line (e.g., shown in FIGS. 3 and 5), where the pressure sensor is optionally positioned relatively close to the sample probe assembly 750, and the pressure sensor responds to the decrease of pressure in the sample pressure line following said removal. Actuation of switch 770 opens valve 740, causing sheath fluid 730 to flow through a path to an opening in the sample probe assembly and adjacent, near, above, or surrounding the sample probe 750. The flowing sheath fluid 730 removes residue from the prior sample, carrying it in solution or suspension to the bottom end of the probe 750, where it forms a probe wash runoff stream 760 or a series of drops that fall into a probe wash receptacle 780 (e.g., a funnel-shaped receptacle). The bottom of the receptacle 780 is connected by tubing 790 to the waste line (not shown), allowing passive aspiration of the probe wash runoff 760 into the waste tank (not shown) (through, e.g., the Venturi effect).

Figure 8:
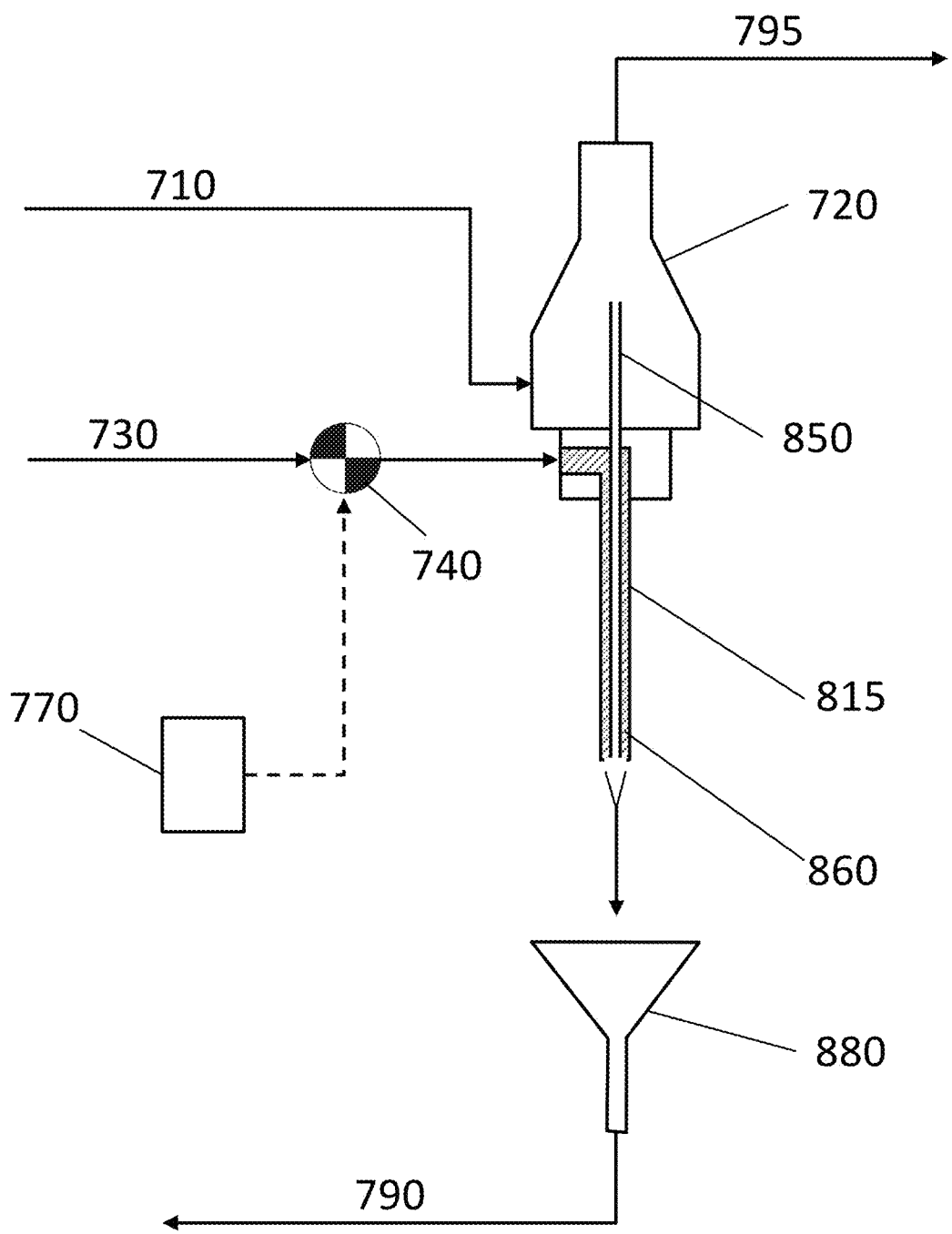
FIG. 8 is a schematic illustration of a sample probe wash module of an apparatus in accordance with some embodiments.

FIG. 8 illustrates an alternative sample probe wash module of a configurable or modular flow cytometry apparatus, in accordance with some embodiments of the present disclosure. Some elements in the apparatus in FIG. 8 are the same as those described with respect to the apparatus shown in FIG. 7. In the alternative embodiment illustrated in FIG. 8, the bottom portion of the sample probe 850 is surrounded by a probe wash tube 815, which contains and guides the probe wash runoff 860 before it separates from the probe 850 and drops toward the receptacle 880. In yet another embodiment that combines elements of FIGS. 7 and 8 (not shown), the bottom portion of the sample probe is surrounded by a probe wash tube, and the sheath fluid directed to the sample probe assembly in response to actuation of the switch is routed both to the space between the probe and the probe wash tube, and to the outside of the probe wash tube. In this embodiment, the sample probe is protected from a range of potential accidental damage, while sample residue both outside and inside the probe wash tube is removed by the actuated flow of sheath fluid.

Figure 9A:
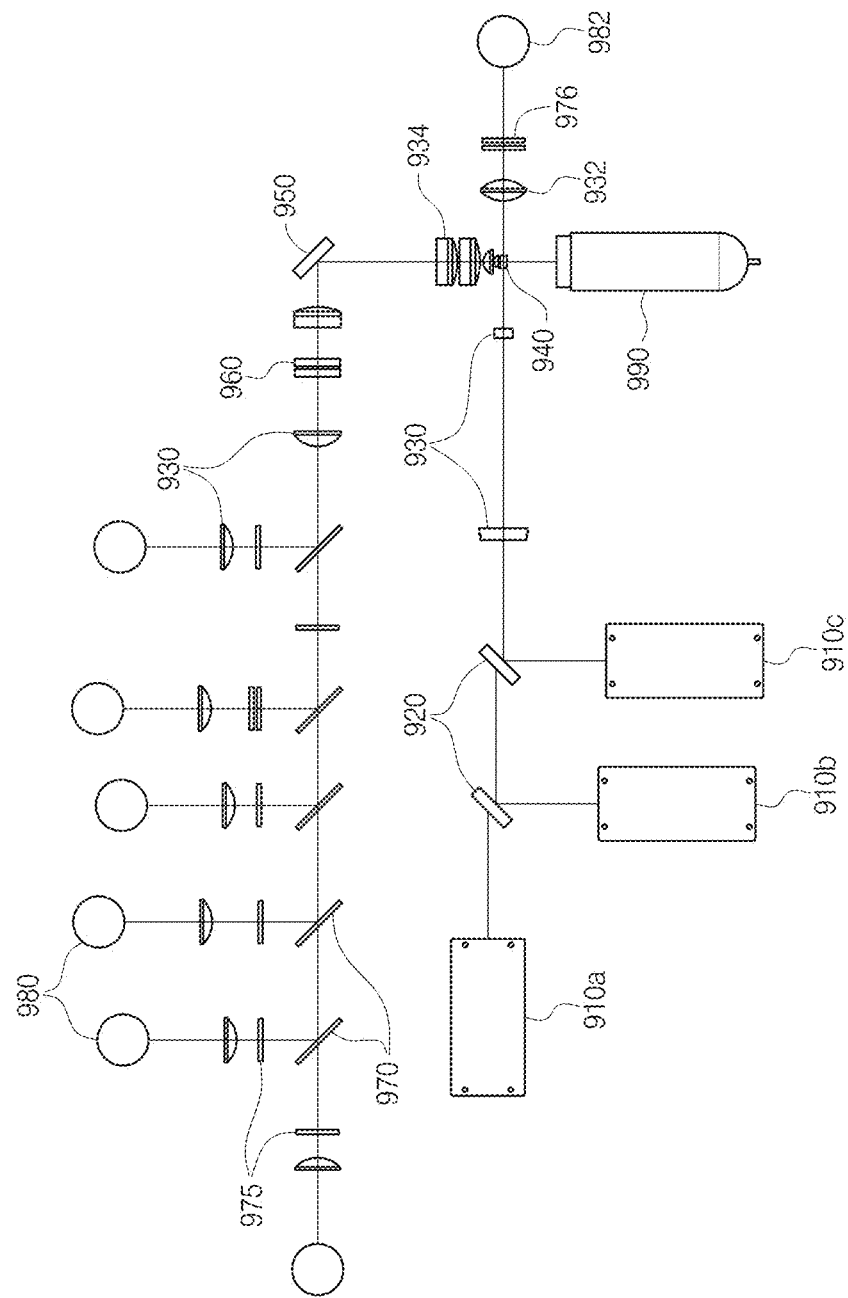
FIGS. 9A-9C are schematic illustrations of a modular optical layout architecture of an apparatus in accordance with various embodiments.

FIG. 9A schematically illustrates the optical layout (also referred to as optical bench, optical module, or optical subassembly) architecture of a configurable or modular flow cytometry apparatus, in accordance with some embodiments of the present disclosure. The optical layout shown in FIG. 9A includes laser excitation sources 910, beam combiners 920, lenses 930, flowcell 940, mirror 950, pinhole 960, dichroic beamsplitters 970, optionally one or more spectral filters 975, detectors 980, and microscope 990. Each detection channel in FIGS. 9A-9C has a beamsplitter 970 (or a shared beamsplitter 970), a spectral filter 975, a focusing lens 930, and a photodetector 980 (as will be described further with respect to FIG. 14); however, only some of these elements are labeled for simplicity. In this illustration, the beams from multiple laser excitation sources 910*a-c* are combined, shaped, and focused into the flowcell 940, where the hydrodynamically focused sample stream carries particles to be analyzed. The flowcell 940 is continuously monitored by a dedicated digital microscope 990. Interaction of the particles with the laser beam(s) produces light emitted from the flowcell, e.g., without limitation, scattered and fluorescent light from the sample within the flowcell. After the unscattered laser light and light scattered statically by the flowcell walls is blocked (as further described herein, e.g., with reference to FIG. 12), a lens 932 captures scattering of light within a narrow cone (e.g., without limitation, a cone with an about 10 degrees half-angle) aligned with the beam propagation, and relays it, after passing through optional spectral filter 976, to a forward-scatter detector ("FSC") 982. Blocking of the undesired laser and statically scattered light can optionally occur after collection by lens 932. Side scattering and fluorescence emissions are captured by a separate, high-NA (Numerical Aperture) collection lens (or collection subassembly) 934 centered around 90 degrees from the forward direction. An optical processing module (as described further herein) removes undesired background, stray light, or stray scattered light from the collected beam, and relays it, after recollimation, to several detectors 980. For each channel of detection, a dichroic beamsplitter 970 separates out a spectral band from the forward-propagating beam, and relays it to optionally one or more spectral filters 975. The selected, filtered band of light is then refocused by a lens 930 onto the active surface of a photodetector 980 (such as, e.g., without limitation, a photomultiplier tube [PMT], a silicon photomultiplier [SiPM], an avalanche photodiode [APD], or a photodiode [PD]), where it is converted to an electrical signal. The dichroic beamsplitters 970 can separate the light emitted from the sample in the flowcell into different wavelength bands for detection in the different detection channels (or modules). For example, the wavelength bands detected by different detection channel can be centered, without limitation, around 266 nm, around 280 nm, around 320 nm, around 355 nm, around 375 nm, around 405 nm, around 488 nm, around 525 nm, around 532 nm, around 561 nm, around 574 nm, around 594 nm, around 615 nm, around 635 nm, around 667 nm, around 785 nm, or around other wavelengths corresponding to the wavelength of the excitation source, one or more of the Raman emissions of the sample, one or more of the autofluorescence emissions of the sample, or one or more of the fluorescence emissions of the one or more exogenous labels used. In some cases, different types of photodetectors can be used to detect the light in different wavelength bands. Collection of side scattering and fluorescence emissions can, in some embodiments, be arranged to be centered around an angle of less than about 90 degrees from the forward direction, and in other embodiments around an angle of greater than about 90 degrees from the forward direction, up to about 180 degrees (in which case the resulting collected scattering signal is also referred to as backscattering).

FIG. 9A illustrates a particular embodiment comprising three laser sources 910*a-c* and seven detection channels (FSC, detected by detector 982; side scatter ["SSC"], detected, e.g., by the rightmost of detectors 980; and five fluorescence channels [FL1-FL5], detected, e.g., by the remaining detectors 980). It will be appreciated by those skilled in the art that the present disclosure is not limited to such choices of number of laser sources and detection channels. The disclosed modular architecture is capable of supporting fewer light sources (e.g., without limitation, as few as one) as well as a greater number of them (e.g., without limitation, up to five, up to 10, or more than 10), and is also capable of supporting fewer detection channels (e.g., without limitation, as few as one) as well as a greater number of them (e.g., without limitation, up to 20, up to 30, up to 40, up to 50, or more than 50). Indeed, one of the advantages of the disclosed architecture, i.e., its modularity, is such that light sources and detection channels can be added or removed easily from the design, allowing rapid configuration or reconfiguration of a particular instrument for specific needs.

Figure 9B:
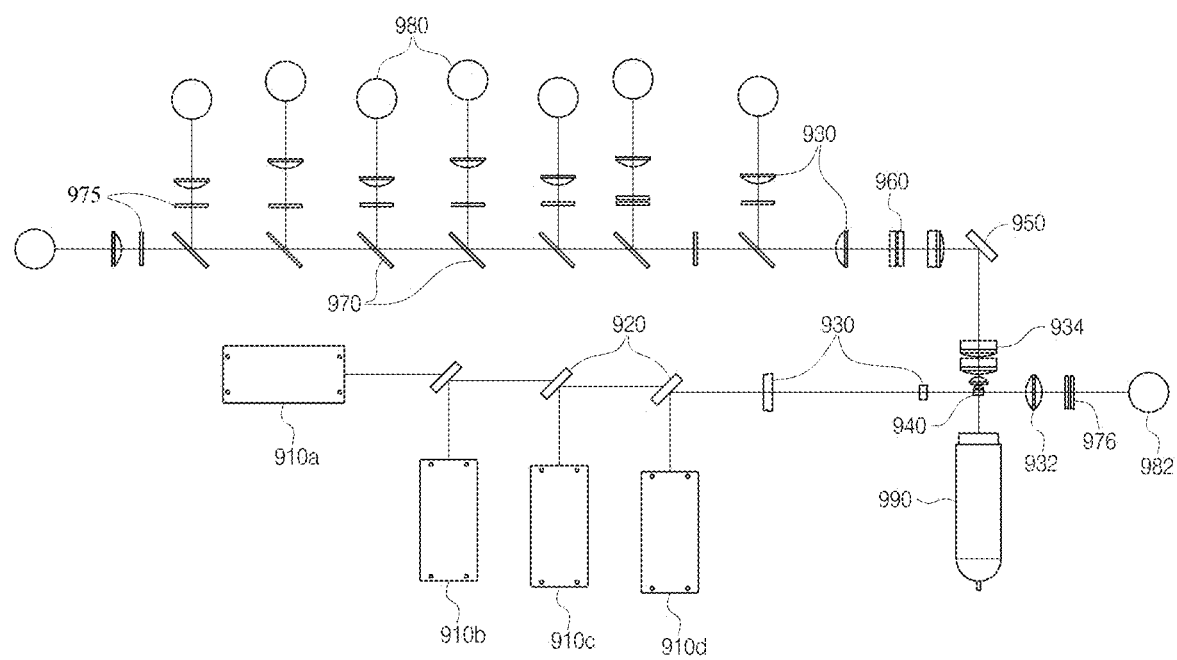
Figure 9C:
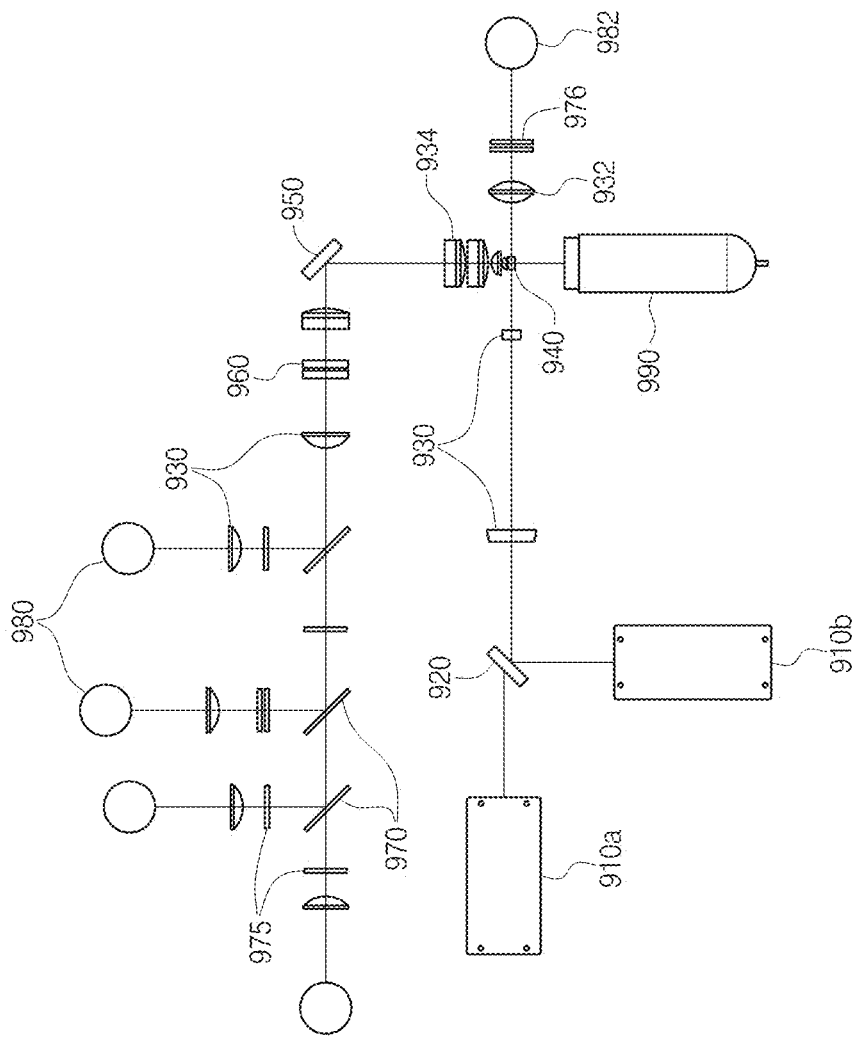

FIGS. 9B and 9C schematically illustrate alternative optical layout architectures of configurable or modular flow cytometry apparatuses, in accordance with some embodiments of the present disclosure. The instrument optical layout illustrated in FIG. 9B incorporates four laser sources 910*a-d* and nine detection channels (FSC, SSC, FL1-7), and the layout illustrated in FIG. 9C incorporates two laser sources 910*a-b* and five detection channels (FSC, SSC, FL1-3).

The optical architecture of this disclosure makes this modularity possible by the use of substantially collimated beams in both the excitation and the detection arms. Collimated beams comprise substantially parallel light rays; therefore, optical components placed along their paths can, to a high degree, be translated longitudinally along the propagation path without substantially affecting performance. In addition, substantially zero-power optical components (such as, e.g., without limitation, mirrors, dichroic beamsplitters, and filters) can be inserted or removed from a collimated-beam optical path without altering the downstream focusing behavior. Relatively thin substantially zero-power transmissive components inserted or removed at nonzero incidence (such as, e.g., dichroic beamsplitters used at a 45-degree angle of incidence) only cause a slight transversal shift in the beam centerline (also called chief ray), which can be easily accommodated in the disclosed architecture; and otherwise have substantially negligible effects on the transmitted beams. The ability to easily and quickly configure and reconfigure optical layouts based on the modular architecture described herein is an advantage of the flow cytometry apparatuses and method described herein over the prior art.

Figure 10:
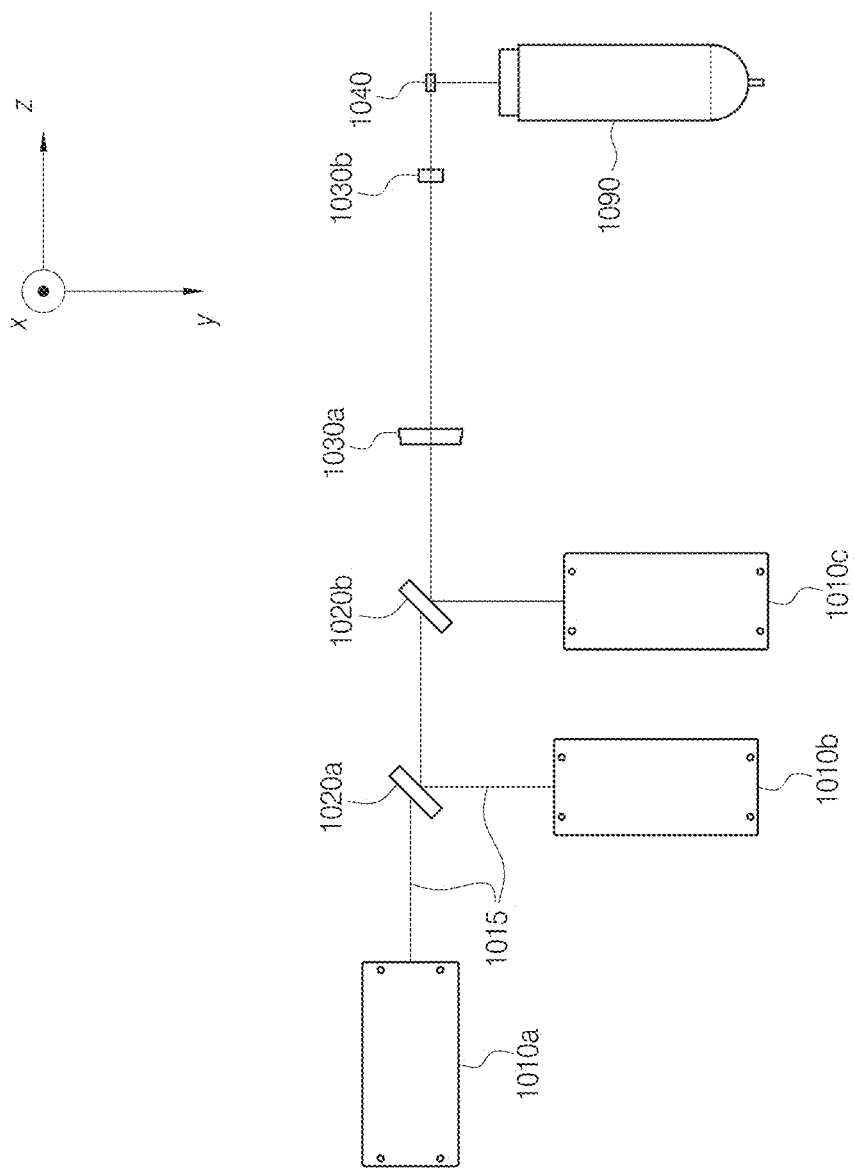
FIG. 10 is a schematic illustration of a modular excitation architecture of an apparatus in accordance with some embodiments.

FIG. 10 shows a detail of the excitation arm of an optical architecture in accordance with some embodiments, corresponding to the apparatus of FIG. 9A. The three excitation light sources 1010*a-c* (e.g., without limitation, lasers) shown are all positioned upstream of any optics with substantial focusing power, such as the two lenses 1030*a-b* indicated in the diagram. Laser light sources have generally, and can be specified to have, substantially collimated outputs; i.e., their output beams propagate as bundles of substantially parallel light rays. Laser beams generally depart substantially from collimation due to diffraction only over relatively large distances. By proper design and implementation according to design principles described in this disclosure and other optical principles known to those skilled in the art, the architecture shown in FIG. 10 with respect to three laser excitation sources 1010*a-c* can be easily modified in a modular way to accommodate only two, only one, four, five, or more lasers. By adding or removing laser beams upstream of any focusing optics (e.g., lenses 1030*a-b*), the beams are manipulated in the collimated portions of their paths, reducing or eliminating the effects of such additions or removals on the existing or remaining laser beams.

Laser beams in this example are combined using, e.g., dichroic beamsplitters used "in reverse", as shown in FIGS. 9A-9C (indicated as beam combiners 920) and FIG. 10 (indicated as beam combiners 1020*a-b*). Suitable beamsplitters for this purpose include, without limitation, longpass, shortpass, bandpass, and multiband dichroics. Further suitable beamsplitters would be, without limitation, partial reflectors, half-silvered mirrors, pellicle beamsplitters, cube beamsplitters, polarized beamsplitters, and knife-edge mirrors. The use of beamsplitters as beam combiners 1020*a-b* allows multiple lasers 1010*a-c* to be employed simultaneously, and also to be employed one or more at a time, by selectively operating the laser(s) of interest. In an alternative embodiment (not shown), removable mirrors (e.g., without limitation, mounted on quick-release kinematic stages or magnetic kinematic stages) are used instead of beamsplitters; in this case, lasers are used one at a time, with the mirror(s) corresponding to the unused laser(s) temporarily removed and the corresponding lasers deactivated. In yet another embodiment (further described herein with reference to FIG. 19), combinations of beamsplitters and mirrors as described above are used.

In an embodiment, the first laser 910*a* at left in FIG. 9A (corresponding to laser 1 1010*a* in FIG. 10) is a deep-UV 266-nm light source, the middle laser 910*b* in FIG. 9A (corresponding to laser 2 1010*b* in FIG. 10) is a 405-nm light source, and the laser 910*c* at right in FIG. 9A (corresponding to laser 3 1010*c* in FIG. 10) is a 375-nm light source. In an embodiment, the first (left) beam combiner 920*a* in FIG. 9A (beam combiner 1 1020*a* in FIG. 10) is a shortpass dichroic beamsplitter having a transition edge between about 270 nm and about 400 nm, and the second (right) beam combiner 920*b* in FIG. 9A (beam combiner 2 1020*b* in FIG. 10) is a longpass dichroic beamsplitter having a transition edge between about 380 nm and about 400 nm. The selection of violet (e.g., without limitation, 405 nm) and ultraviolet (e.g., without limitation, 375 and 266 nm) light sources presents certain advantages in applications of flow cytometry to the analysis of cells (such as, without limitation, human cells, animal cells, plant cells, bacteria, algae, and other microorganisms), as well as to the analysis of other organic particles (such as, without limitation, viruses, microvesicles, extracellular vesicles, and exosomes), to the analysis of inorganic particles (such as, without limitation, nanoparticles, microparticles, quantum dots, microdroplets, and particles found in emulsions, suspensions, aerosols), and to the analysis of compounds in liquid solutions (e.g., without limitation, proteins, enzymes, macromolecules, lipids, sugars, chemical species, chemical compounds, physical aggregates, and physico-chemically bound entities). In particular, violet and ultraviolet light sources are desirable for the excitation of autofluorescence from a wide range of organic and inorganic compounds, some of which are commonly present in cells. Efficient excitation of autofluorescence enables improved measurements of autofluorescent emissions from compounds of interest, which can be used to establish presence, concentrations, absolute quantities, ratios, configurations, metabolic states, chemical states, and other parameters relating to the compounds themselves and/or to the entities (e.g., cells) in which they are found or with which they are associated.

It will be apparent to those skilled in the art that other choices of lasers, and other choices of beam combiners, are consistent with the scope of the present disclosure and encompassed by it. Further, any one of the excitation sources represented in FIGS. 9A-9C and 10 may optionally be a laser mounted externally to the apparatus, optically coupled to it by means of, e.g., without limitation, mirrors, lenses, windows, portholes, shutters, light pipes, tubes, irises, pinholes, targets, and/or beam splitters or combiners. In one embodiment, laser 1 1010*a* in FIG. 10 is a 266-nm external laser, whose beam is optionally routed and aligned into the apparatus using mirrors and irises and optionally passes through a porthole, an openable shutter, and lens tubes before optionally reaching beam combiner 1 1020*a* (which, along with beam combiner 2 1020*b*, can optionally be removed to provide the 266 laser beam an uninterrupted path to the cylindrical lenses).

FIG. 10 also illustrates an example where two crossed cylindrical lenses 1030*a* and 1030*b* in the beam paths are used to obtain the desired shaping and focusing of the beams. The first lens 1030*a* is a positive cylindrical lens oriented so as to focus the laser beams in the horizontal (in-page, or y) direction, i.e., a direction transversal to the direction (x) of fluid flow in the flowcell. The second lens 1030b is a positive cylindrical lens oriented so as to focus the laser beams in the vertical (out-of-page, or x) direction, i.e., the direction parallel to the direction (x) of fluid flow in the flowcell. With laser beams having substantially or predominantly Gaussian intensity profiles in both transversal directions (but also optionally in the case of flat-top beams and other beam profiles), it is desirable for the beams to be focused asymmetrically into the flowcell for particle interrogation: the horizontal beam waists in the plane perpendicular to the sample core stream flow direction being larger than the vertical beam waists along the stream flow direction. The specific values of the beam waists can be chosen from a range of dimensions, according to the specific application of interest, the nature of the particles to be interrogated, the wavelength of laser light being used, the internal cross-sectional dimensions of the flowcell, and other considerations. A suitable horizontal (y direction) beam waist may be in the range of about 40 to about 160 μm ($1/e^2$ full waist), although for certain specific needs it may be desirable to obtain horizontal beam waists larger than about 160 μm or smaller than about 40 μm. A suitable vertical (x direction) beam waist may be in the range of about 10 to about 40 μm ($1/e^2$ full waist), although for certain specific needs it may be desirable to obtain vertical beam waists larger than about 40 μm or smaller than about 10 μm.

For embodiments comprising more than one excitation wavelength, the cylindrical lenses may be approximately achromatic at the excitation wavelengths. Generally, the cylindrical focusing lenses can have focal lengths in a ratio of about 3 to 5, the horizontal lens 1030a having the larger focal length, although ratios greater than 5 or smaller than 3 are in certain cases more desirable. Placing the cylindrical lenses substantially their respective focal length away from the plane perpendicular to light propagation that passes through the center of the sample core stream in the flowcell (using the appropriate optical path length) results in the respective beam waists forming substantially on that plane. Detailed optical propagation calculations can inform the precise placement of lenses 1030a-b and other optical components in the systems described herein in order to account for second-order effects, aberrations (such as, without limitation, chromatic, spherical, coma, and astigmatic aberrations), beam offsets, manufacturing variations, and other possible departures from an approximate model.

Not illustrated in FIG. 10 are alternative embodiments of the disclosed architecture that achieve the same purpose using other devices known in the art. For example, instead of two crossed cylindrical lenses, the collimated laser beams can be subjected to asymmetric expansion (through, e.g., without limitation, an anamorphic prism pair, or through a cylindrical beam expander), followed by focusing through a single spherical lens. The asymmetrically expanded beams (with the horizontal resulting y dimension larger than the verticalxdimension) can produce asymmetrically focused beam waists substantially similar to the waists described above. The output beams from the lasers themselves may alternatively be specified to have a desired degree of ellipticity (e.g., without limitation, a 4:1 ratio of vertical to horizontal), so that only a single spherical, aspheric, or achromatic compound lens is necessary to produce the asymmetric focusing on the center plane of the sample core stream as described above. It will be appreciated by those skilled in the art that other ways exist to achieve substantially similar results that do not depart from the spirit and principle of the present disclosure.

Figure 11:
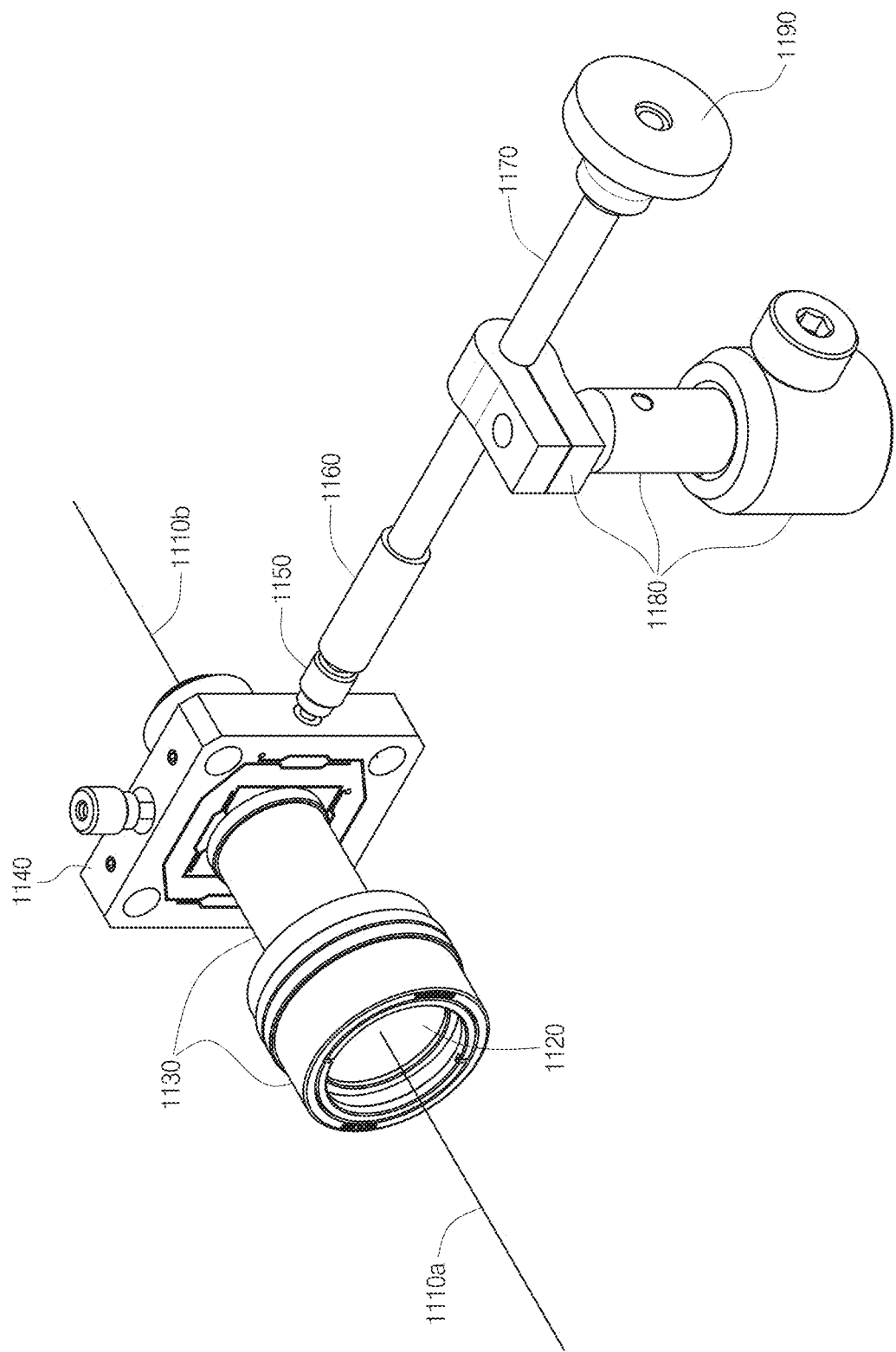
FIG. 11 is a schematic illustration of an externally adjustable laser fine alignment module of an apparatus in accordance with some embodiments.

FIG. 11 illustrates an externally adjustable laser fine alignment module of a configurable or modular flow cytometry apparatus in accordance with some embodiments of the present disclosure. In the example shown in FIG. 11, a horizontal cylindrical lens (i.e., a cylindrical lens oriented to perform focusing of a substantially collimated beam substantially in the horizontal direction), such as, e.g., cylindrical lens 1030a in FIG. 10, is mounted using hardware 1130 known in the art (such as, without limitation, custom mounts, lens mounts, lens tubes, lens tube reducers, lens tube couplers, and/or retaining rings) to a lens translation stage 1140 (such as, without limitation, an X stage, an XY stage, an XYZ stage, a 4-axis stage, a 5-axis stage, a flexure mount, a dovetail stage, a crossed-bearings stage, a threaded mount, or other mechanical positional motion adjuster as are known in the art). The translation stage 1140 may be a stage capable of adjusting the horizontal position only, or it may be capable of adjusting the horizontal and vertical positions, or it may be capable of additional adjustments beside the horizontal and vertical positions. The externally adjustable laser fine alignment module can adjust the propagation direction of an input light beam 1110a to an adjusted propagation direction of light beam 1110b.

The horizontal adjustment element 1150 of the translation stage 1140, e.g., a threaded bolt that translates linearly the spring-loaded movable member of the stage 1140 when turned, is actuatable using a tool such as a hexagonal key (also known as, e.g., Allen key, Allen wrench, or hexagonal ball driver), a screwdriver (such as, e.g., a Phillips head, a flat head, star, or other type), or other suitable tool comprising a shaft and a shaped point and capable of conveying torque. A guide tube 1170 is mounted (e.g., without limitation, to a base, breadboard, plate, or horizontal panel) using hardware 1180 known in the art (such as, without limitation, custom holders, clamps, brackets, posts, post holders, bases, pedestals, holding forks, and/or bolts) so as to align such torquing tool with and onto the knob of the adjustment element. The guide tube 1170 is capped with an inner funnel 1160 at the distal end (closest to the knob) that reduces the variability in transversal position of the torquing tool to aid with insertion into the mating recess of the knob. The guide tube 1170 is also provided with a light baffle 1190 comprising an outer flare and optional optical gasket at the proximal end (closest to the hand of the operator) that reduces or substantially eliminates the amount of stray light permitted to either exit or enter the optical bench. The light baffle 1190 is attached to the guide tube 1170 so as to make contact with the inner surface of a front panel of the apparatus, into which panel a hole is provided that aligns with the guide tube and permits the insertion of the torquing tool through the panel, along the tube, past the funneled cap, and onto the adjustment knob. In other embodiments, adjustment elements that rely on different actuation mechanisms (such as ratchets, pulleys, springs, and other mechanisms known in the art) are actuated in similar ways using a tool capable of reaching and actuating the adjustment element from outside the apparatus.

The module described herein with respect to FIG. 11 therefore permits the adjustment of the horizontal cylindrical lens externally or by external means, i.e., without requiring the operator to lift the apparatus cover, remove the front or side panels, or otherwise alter the intended configuration of the instrument in ways that could impair its performance. Horizontal adjustment of the horizontal cylindrical lens in the optical layout described herein causes an angular shift, on a plane perpendicular to the sample core stream flow direction, in the propagation direction of the beam(s) 1110b refracted through the lens. Such controlled shift aids in fine-tuning the alignment of the beam(s) with the sample core stream in the flowcell (which is flowing vertically in this embodiment), allowing substantial maximization of excitation intensity and substantial maximization of the optical signals generated in the interactions with particles of interest in the sample stream. An operator is therefore enabled to rapidly optimize the performance of the apparatus using inexpensive means and tools without unduly burdening the measurement workflow.

It will be apparent to those skilled in the art that other configurations of the components and elements described herein are encompassed by this disclosure. In another embodiment, for example, the main direction of sample stream flow in the flowcell is horizontal, and the direction of the interrogating light beam(s) transversal to the flow is also horizontal. Cylindrical lens 1030a of FIG. 10 is in such embodiment vertically oriented, while cylindrical lens 1030b of FIG. 10 is horizontally oriented; and the module of FIG. 11 is modified so as to provide vertical adjustment to the position of cylindrical lens 1030a. The light baffle in such embodiment contacts the internal surface of the top cover of the apparatus, and fine adjustment of alignment of laser beam(s) with the sample core stream by external means is achieved by insertion of the torquing tool through a hole provided in such top cover. Other embodiments, e.g., where the direction of sample stream flow is horizontal, the direction of beam propagation is vertical, and the orientation of cylindrical lens 1030a of FIG. 10 is horizontal perpendicular to the flow direction; or where the direction of sample stream flow is neither horizontal nor vertical and where the orientation of cylindrical lens 1030a of FIG. 10 is neither vertical nor horizontal; are also possible and encompassed by this disclosure.

In another embodiment, the lens translation stage 1140 of FIG. 11 is provided with motorized adjustment(s), capable of remote actuation through, e.g., electrical or wireless control. In such embodiment, insertion of a mechanical torquing tool from the exterior is unnecessary, as are the guide tube 1170, the funnel cap 1160, the light baffle 1190, and the guide tube mounting hardware 1180. In such cases, the positional adjustment(s) of the movable member of the lens translation stage 1140 can be controlled through direct electrical actuation (e.g., without limitation, by application of a voltage impulse to a DC motor, by application of series of impulses to a stepper motor, or by application of voltage signals to a galvo driver and motor or or to a piezoelectric actuator) or by wireless signals received by suitable wireless communication modules as are known in the art, translated into actuation signals, and conveyed to an electrical actuator such as those described above. External adjustment of laser alignment with the sample stream is therefore achieved in this embodiment using electrical or wireless signals conveyed to actuator(s) for the translation of a cylindrical lens in the path of the laser beam(s).

As described above in reference to FIG. 10, the crossed cylindrical lens pair illustrated in FIGS. 9A-9C and 10 may be replaced in other embodiments with other means of obtaining asymmetric focusing of the beam(s), such as, e.g., using anamorphic prism pair(s), cylindrical beam expander(s), natively elliptical laser beams, internally elliptically shaped laser beams, and other devices known in the art, and one or more spherical or aspherical lenses for focusing the beam(s) onto the sample core stream in the flowcell. In such embodiments, the element subject to translation using the configuration illustrated in FIG. 11 may be one of the one or more spherical or aspherical lenses, another optical element with nonzero optical power in the direction of translation, the laser(s) themselves, or the flowcell itself. And also as described above, the present disclosure is not limited to horizontal translation of such element(s) for effecting external adjustment of the laser alignment to the sample stream, but encompasses any direction at all.

The same principle illustrated above in reference to FIG. 11 for transversal adjustment of laser alignment to the sample core stream also applies to adjustment of laser alignment along the sample stream flow direction. In one embodiment, the elements illustrated and described in reference to FIG. 11 refer to cylindrical lens 1030b of FIG. 10, e.g., a cylindrical lens oriented (vertically) substantially along the direction of sample stream fluid flow. The adjustment obtained using the module described above as applied, e.g., to such a lens achieves changes in propagation direction of the laser beam(s) on a plane that comprises the flow direction. Such adjustment can be desirable to obtain maximum coupling of the emitted (e.g., without limitation, scattered and fluorescent) light into the one or more photodetectors shown in FIGS. 9A-9C and 14 and therefore to obtain maximum signal from the interaction of sample particles with the laser beam(s). As above, it is not necessary for sample flow to be in the vertical direction; sample flow may be oriented in any direction at all, with the translation module described herein providing translation in substantially the same direction as the flow. In another embodiment, adjustment by external means of laser alignment along the direction of flow is based on at least partial overlap of the direction of translation with the direction of flow, with greater overlap producing the desired effects with greater efficiency.

Figure 12:
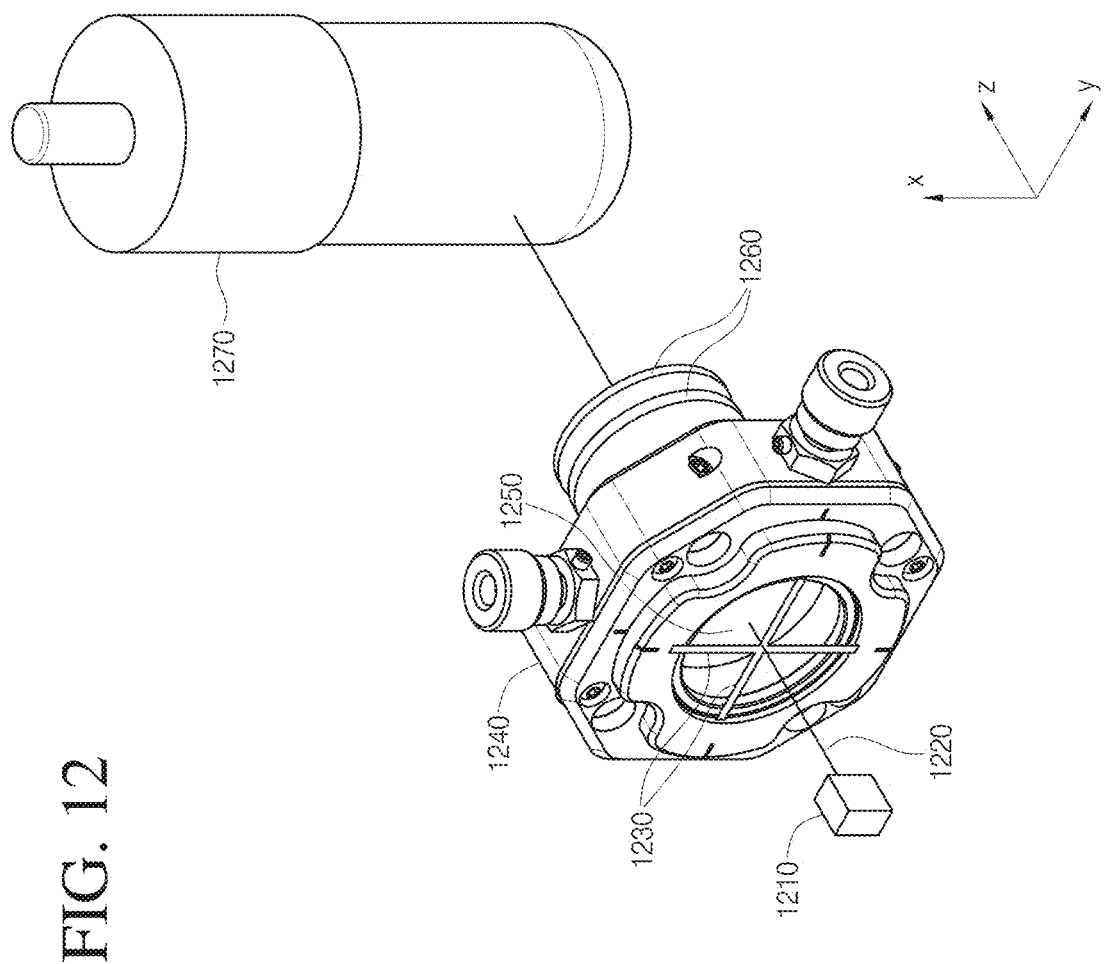
FIG. 12 is a schematic illustration of a stray-light blocking module of an apparatus in accordance with some embodiments.

FIG. 12 illustrates a stray-light blocking module of a configurable or modular flow cytometry apparatus, in accordance with some embodiments of the present disclosure. One or more sources of excitation light (as in, e.g., without limitation, laser(s)) are focused onto the sample stream in the flowcell 1210 as described above. The excitation light beam(s) interact with particles in the sample stream and generate optical signals of interest, such as, without limitation, forward scatter, small-angle scatter, intermediate-angle scatter, side scatter, back scatter, absorption, extinction, fluorescence, Raman, coherent anti-Stokes Raman scattering, and other signals. At least a portion of such signals is collected and selected using optics such as, without limitation, lenses, mirrors, beamsplitters, filters, gratings, prisms, optical fibers, and/or diffractive optical elements, and conveyed to photodetector(s), as described above. FIG. 12 shows a portion of an FSC detection module of an apparatus in accordance with an embodiment of the disclosure, together with an element designed to reduce unwanted optical background. A relay element 1250 (such as, without limitation, a best-form lens, a biconvex lens, a planoconvex lens, an aspherical lens, an achromat, a compound lens, or an off-axis parabolic mirror) collects light (aligned along beam propagation direction 1220) emerging from the flowcell 1210 in a cone approximately centered on the forward direction (i.e., the direction of propagation of the excitation light beam(s)). The lens 1250 is housed in a translation mount or stage 1240 that comprises transversal adjustments (such as an XY stage). Light relayed by the lens is optionally passed through one or more filters 1260 (such as, without limitation, neutral-density, bandpass, shortpass, longpass, multi-band, and/or color filters) before reaching the active surface of a photodetector 1270 (such as, without limitation, a PMT, an SiPM, an APD, or a PD), where it is converted to an electrical signal.

Light emerging from the flowcell 1210 in the forward direction includes desired optical signals, such as forward-scattering signals from particle(s) in the flowcell; but generally also includes undesired contributions to the optical signal, such as scattering from flowcell surfaces, imperfections, or deposits, as well as diffraction, refractions, and/or reflections of the excitation beam(s), which can propagate in the forward direction in substantial overlap with the desired optical signals. Such undesired contributions can cause elevated background, elevated optical and electrical noise, and can act to degrade or hide the desired signals altogether. To reduce the impact of such undesired contributions, in one embodiment, an FSC module of the disclosure comprises an obscuration mask 1230 fastened onto the element housing the relay lens 1250 (such as, without limitation, the lens mount, the lens translation mount, or the lens translation stage 1240). The obscuration mask 1230 comprises one or more elements designed to block unwanted optical contributions from reaching the FSC photodetector 1270. In one embodiment, the obscuration mask 1230 is substantially in the shape of a cross whose arms are aligned, respectively, with the longitudinal axis (the x direction, as shown in FIG. 12) of the flowcell 1210 (i.e., the axis substantially along which fluid flows) and in the y direction (i.e., at a right angle to both the longitudinal axis (in the x direction) and the light propagation (z) direction). The two arms of the obscuration mask, in this embodiment, are dimensioned to block as much of the unwanted light as possible (e.g., without limitation, up to about 50%, up to about 80%, up to about 90%, or greater than about 90%), while simultaneously allowing as much of the desired optical signals to pass through (e.g., without limitation, up to about 30%, up to about 50%, or greater than about 50%).

In one embodiment, the relay lens 1250 is placed in such a position so as to relay desired scattered light from a particle in the sample core stream onto the active surface of the photodetector 1270, according to principles of fundamental optics well known in the art. In some cases, the position of the relay lens 1250 is also such to subtend a cone of desired scattered light having the desired angular extent (e.g., without limitation, an FSC cone with a half-angle of less than about 2 degrees, between about 2 degrees and about 5 degrees, between about 5 degrees and about 10 degrees, or greater than about 10 degrees). In some cases, the lens translation stage 1240 onto which the mask 1230 is affixed allows translation of the obscuration mask 1230 into an alignment relationship with the propagation direction of the laser beam(s) 1220 so as to permit maximal rejection of unwanted light while also permitting maximal transmission of desired light. In some cases, the obscuration mask 1230 arms are formed out of nonreflective material (such as, without limitation, black-anodized aluminum, other matte-finish metal, or other matte-finish material able to withstand absorption of a substantial portion of the optical power in each of the beam(s) as well as in all the beam(s) combined). In some cases, each of the arms of the mask 1230 is wide enough (such as, e.g., without limitation, more than about 0.5 mm wide, more than about 1 mm wide, or more than about 2 mm wide) to block the laser beam(s) and a substantial portion of the light diverted from the beam(s) in the absence of particles of interest in the sample core stream. In some cases, each of the mask 1230 arms is narrow enough to allow a substantial portion of the light scattered by particle(s) of interest in the sample core stream to pass through (such as, e.g., without limitation, less than about 1 mm wide, less than about 2 mm wide, or less than about 3 mm wide). In some cases, each of the mask 1230 arms stretches across the entire diameter of the relay lens 1250; and each of the mask 1230 arms is placed as close to the lens 1250 as practical.

Other embodiments that also fall under the scope of the present disclosure include, without limitation: placement of the obscuration mask at other positions than just before the relay lens; and an obscuration mask with shapes other than a symmetric cross with equal straight arms, such as a mask with a cross with flared arms (arms becoming wider away from the center), a cross with tapered arms (arms becoming thinner away from the center), a cross with one arm wider than the other, a cross with arms in mixed combinations (e.g., one arm tapered and one arm flared), a cross where one or more of the mask arms is arranged to stretch across only portion of the relay lens (such as, e.g., without limitation, through the central 30%, 50%, or 70% of the diameter of the relay lens), a "tee" (i.e., a cross with one full arm and half of the other), a single arm (e.g., a single bar, whether straight, tapered, flared, or otherwise), a single arm with a central bulge (e.g., a circular, elliptical, rectangular, or other-shaped element substantially aligned so as to effectively block light from the excitation beams), a cross with a central bulge, a tee with a central bulge, and other mask shapes and configurations that perform a similar function to that described. In some embodiments, an FSC module may not have a relay lens, where the mask is placed as close as practical to the active area of the photodetector, and the photodetector is placed at such a distance from the flowcell so that its active area subtends a cone of desired scattered light having the desired angular extent (e.g., without limitation, a FSC cone with a half-angle of less than about 2 degrees, between about 2 degrees and about 5 degrees, between about 5 degrees and about 10 degrees, or greater than about 10 degrees).

Figure 13:
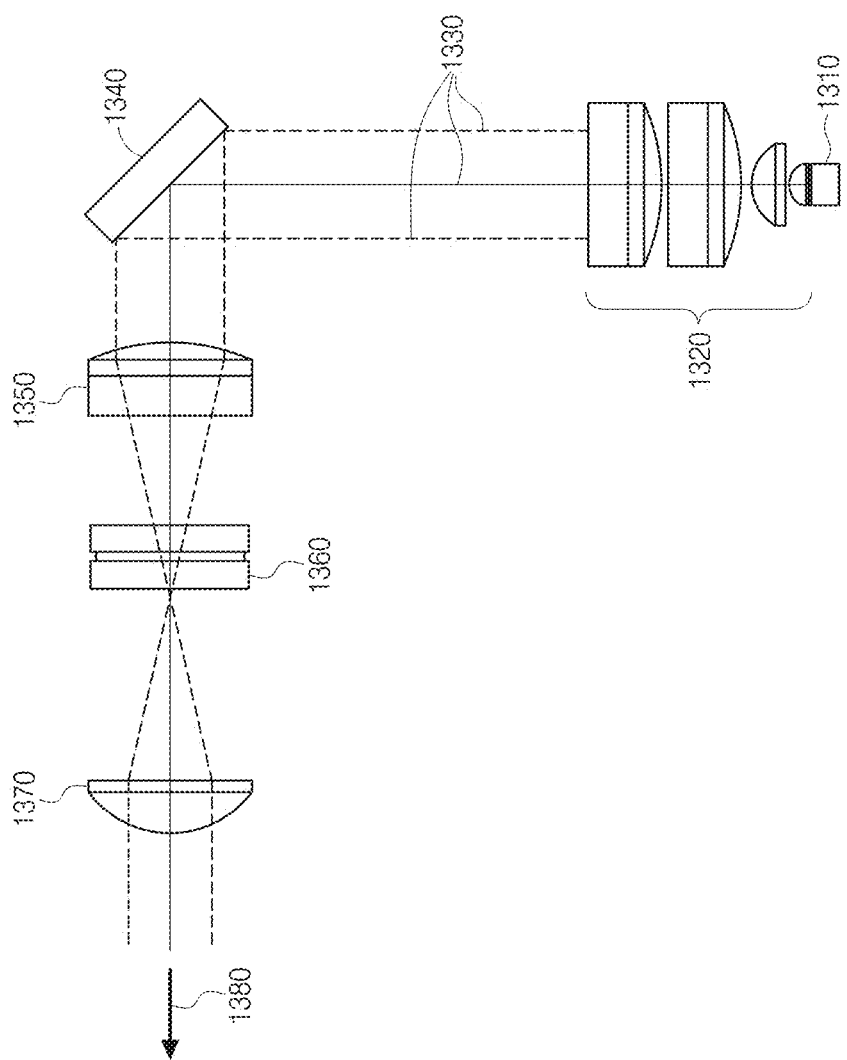
FIG. 13 is a schematic illustration of a stray-light blocking module of an apparatus in accordance with some embodiments.

FIG. 13 illustrates a stray-light blocking module of a configurable or modular flow cytometry apparatus, in accordance with some embodiments of the present disclosure. Light generated by the interaction of the laser beam(s) with particle(s) in the sample stream flowing in the flowcell 1310 (such as, without limitation, SSC and fluorescence) is collected by an optical element or collection subassembly 1320. The collection element or subassembly 1320, also called a collection lens, a condenser lens, or a high-numerical aperture (high-NA) lens, can be a single lens, a compound lens, a set of multiple lenses, a microscope objective, a parabolic mirror, an off-axis paraboloid, and/or an assembly of optical elements as are known in the art. The collection lens 1320 gathers as much of the desired optical light signals as practical. High-NA lenses, high-NA compound lenses, and high-NA microscope objectives (where the NA can be 0.3 or less, 0.5 or less, 1.0 or less, 1.25 or less, and/or less than or greater than 1.3, and where for an NA of approximately 1.0 or greater the first element in the collection subassembly 1320 can be an immersion optical element such as, without limitation, an oil immersion lens or an index-matching-gel-coupled lens) collect more of the desired light signals, generally, than elements or subassemblies with lower NA. In one embodiment, the collection subassembly 1320 is designed to be substantially achromatic over a certain wavelength range of interest, or over one or more wavelength bands of interest. It is not necessary for the subassembly 1320 to be perfectly achromatic, or even substantially achromatic, in all embodiments. In one embodiment, illustrated schematically in FIG. 13, the emitted light collected by the collection lens 1320 exits the collection lens subassembly as a substantially collimated beam or substantially collimated bundle of rays 1330. In some embodiments, such emitted light beam 1330 exiting the collection lens subassembly 1320 is substantially converging, and in other embodiments it is substantially diverging. In yet other embodiments, beams 1330 with certain wavelengths or range of wavelengths exit the collection lens subassembly 1320 substantially collimated, while beams 1330 with other wavelengths or range of wavelengths exit such subassembly 1320 substantially converging and beams 1330 with yet other wavelengths or range of wavelengths exit such subassembly 1320 substantially diverging.

The collected light 1330 is relayed by an optional turning mirror 1340 toward a focusing lens 1350. This focusing lens 1350 focuses the collected emission light 1330 (indicated in FIG. 13 by three representative rays, including the center or chief ray and two side rays) toward a pinhole 1360 (or alternatively an aperture, window, slit, iris, or mask). By arranging the relative position of the flowcell 1310 and the positions and focal lengths of the collection subassembly 1320 and the focusing lens 1350, a real image of the sample core stream can be substantially formed onto the pinhole 1360 plane, according to principles of fundamental optics well known in the art. The dimensions of the pinhole 1360 are chosen so as to pass a substantial portion of the desired collected emission light (e.g., without limitation, up to about 80%, up to about 90%, or more than about 90%) while blocking a substantial portion of undesired stray or scattered light (e.g., without limitation, up to about 80%, up to about 90%, or more than about 90%). For example, for a sample core approximately 20 µm in transversal extent (as viewed from the side of the collection lens 1320), a flowcell 1310 cross-sectional dimension of approximately 400 µm (again as viewed from the collection lens) and a transversal optical magnification ratio of 10×, the real images of the core stream and flowcell 1310 have approximate dimensions of, respectively, 200 µm and 4 mm. A pinhole 1360 with a transversal dimension greater than about 200 µm and less than about 4 mm, centered on the core stream image, can transmit a substantial portion of the desired light (e.g., scattered and fluorescent light emitted by particles interrogated in the sample stream) while rejecting a substantial portion of the undesired light (e.g., without limitation, stray light from the flowcell walls, fluorescent light from unbound dye, and/or Raman scattering from the sheath fluid). In one embodiment corresponding to the approximate dimensions indicated above for core stream and flowcell 1310, a pinhole 1360 can be provided with a diameter of about 1 mm, which performs the desired rejection while maintaining a substantial tolerance margin against variations in the sample core stream dimensions and position.

After the pinhole 1360, a collimating lens 1370 (e.g., without limitation, the same collimating lens identified in and further described below, e.g., in reference to FIG. 14) substantially collimates or recollimates the emission light rays 1330 and relays them in the direction 1380 toward the detection arm (also identified in and further described below, e.g., in reference to FIG. 14). The focal length and position of the collimating lens 1370 can be chosen, in one embodiment, to provide a collimated relayed beam size such that substantially no clipping occurs throughout the rest of the downstream optical paths.

In some embodiments, bundle of rays 1330 exits collection lens 1320 substantially converging, focusing lens 1350 is not present, and pinhole 1360 is placed on the conjugate focal plane of collection lens 1320, on which plane forms a real image of the sample core stream, according to principles of fundamental optics well known in the art. In some embodiments, collection lens 1320 functions also as a focusing lens, outputting substantially converging bundle of rays 1330 directly toward pinhole 1360, which pinhole is placed on the conjugate focal plane of collection/focusing lens 1320, on which plane forms a real image of the sample core stream, according to principles of fundamental optics well known in the art. As above, the dimension of the pinhole can be chosen to transmit a substantial portion of the desired light while rejecting a substantial portion of the undesired light, whether focusing lens 1350 is present, absent, or incorporated into collection/focusing lens 1320.

Figure 14:
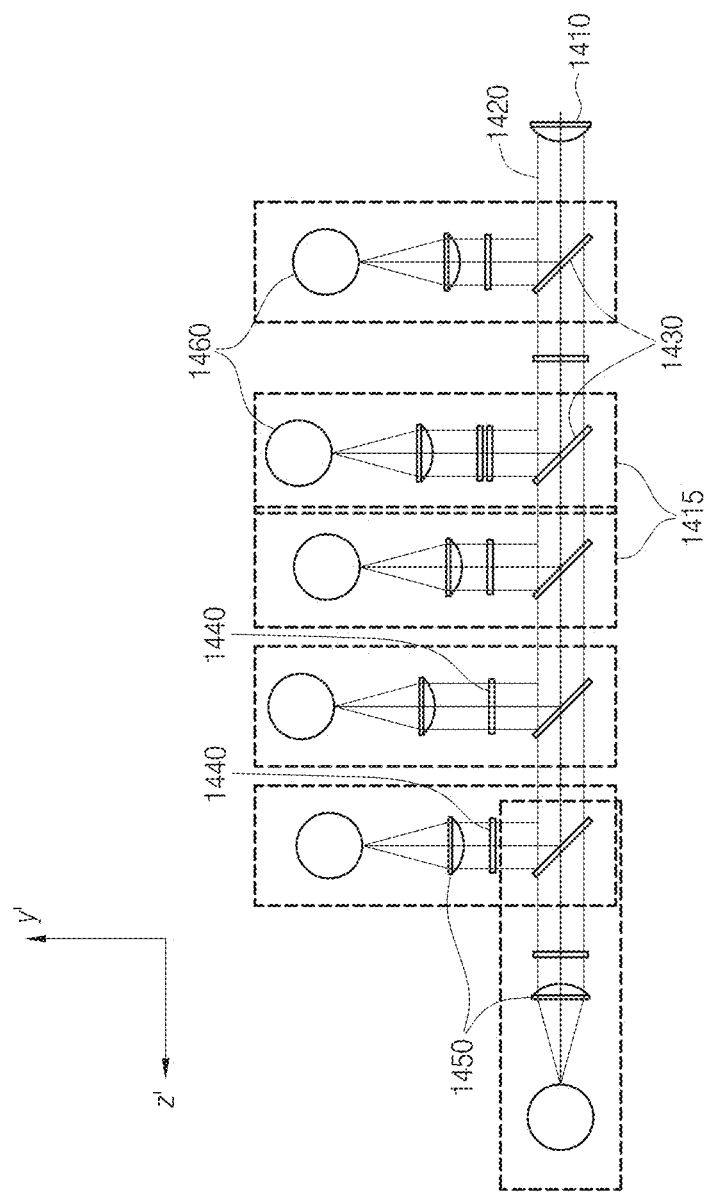
FIG. 14 is a schematic illustration of a modular detection architecture of an apparatus in accordance with some embodiments.

FIG. 14 illustrates a detail of the detection arm of an optical architecture of a configurable or modular flow cytometry apparatus, in accordance with an embodiment corresponding to the apparatus of FIG. 9A. A detection channel 1415 generally comprises a beamsplitter 1430, optionally one or more spectral filters 1440, a focusing lens 1450, a photodetector 1460, and downstream electronics (such as, e.g., one or more electronic amplifiers, an analog-to-digital converter, and other electronics known in the art as desirable for the collection and storage of optical particle interrogation signals; not shown). In some cases, two detection channels share a beamsplitter, for example, as shown in the two detection channels at the far-left side of FIG. 14. Each side detection channel has a beamsplitter 1430 (or a shared beamsplitter 1430), optionally one or more spectral filters 1440, a focusing lens 1450, and a photodetector 1460, however, only some of these elements are labeled for simplicity. FIG. 14 shows an example including six side detection channels 1415 (SSC, FL1-5). The FSC detection channel, such as that shown in FIG. 12, operates on separately collected light and is not shown in FIG. 14. The six side detection channels 1415 are all positioned downstream of the collimating/recollimating lens 1410 (such as, e.g., the collimating lens 1370 indicated in and described above in reference to FIG. 13). The collimating/recollimating lens 1410 produces substantially collimated emission beams 1420 for downpropagation (indicated by the band along the main path or z' direction in the figure). Spectral bands (indicated by beams reflected off individual beamsplitters 1430 in the y' direction, together with the band transmitted in the z' direction by the last beamsplitter 1430 at left of FIG. 14) are split from the main bundle by each the beamsplitters 1430 in turn, which optionally direct each band to one or more filters. The optionally filtered bands are each focused by a lens 1450 onto the active area of a photodetector 1460. Using design and implementation principles described in this disclosure and other optical principles known to those skilled in the art, the architecture shown in FIG. 14 with respect to the six side detection channels 1415 shown can be easily modified in a modular way to accommodate five or fewer side detection channels 1415, or seven or more side detection channels 1415, e.g., as shown in FIGS. 9A-9C. In some cases, adding or removing detection channels 1415 in the collimated section of the detection arm reduces or substantially eliminates the effects of such additions or removals on the existing or remaining detection channels 1415.

Figure 15:
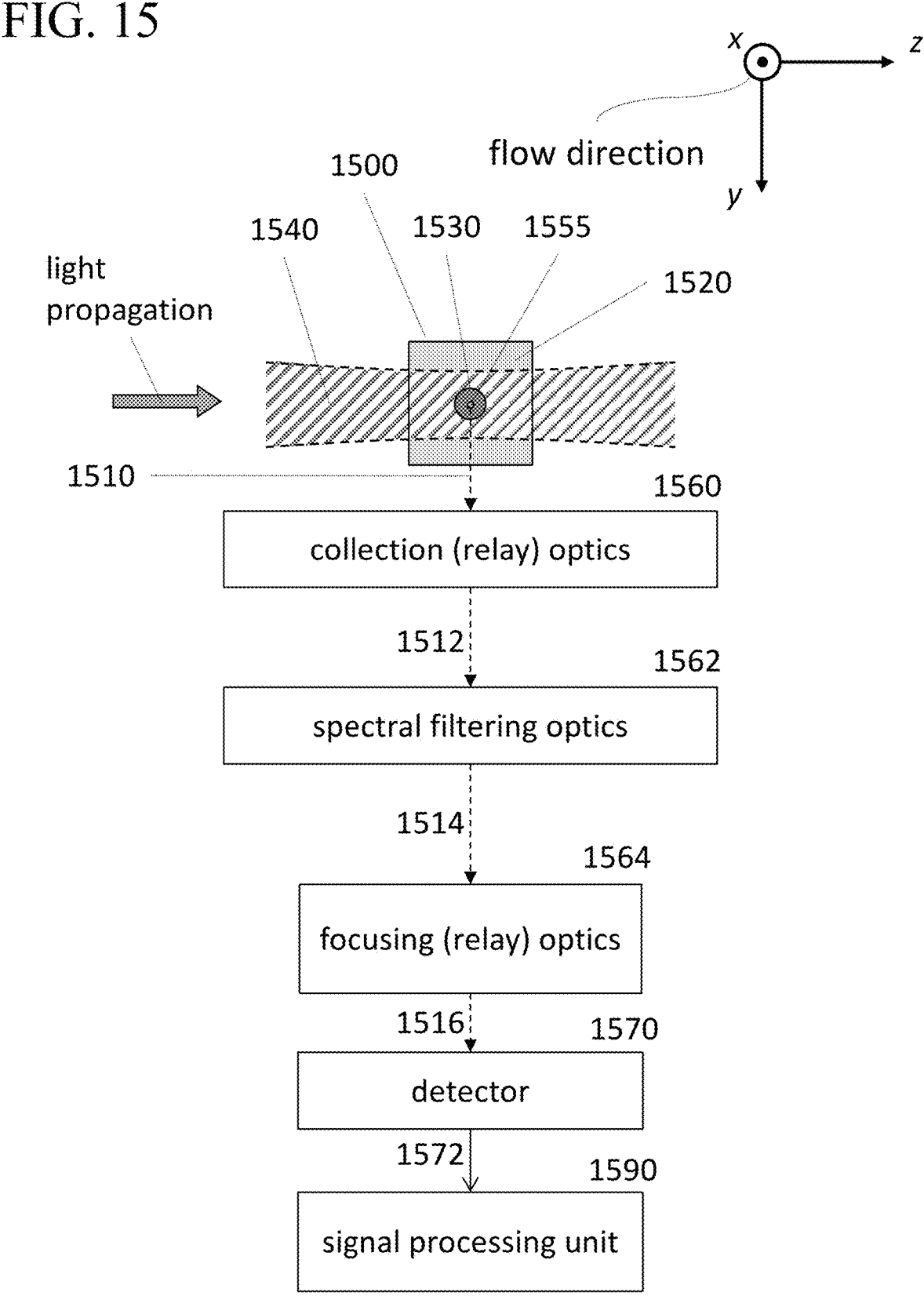
FIG. 15 is a schematic representation of the light collection and detection subsystem of a particle analyzer and/or sorter with a single spectral detection band in accordance with some embodiments.
Figure 16:
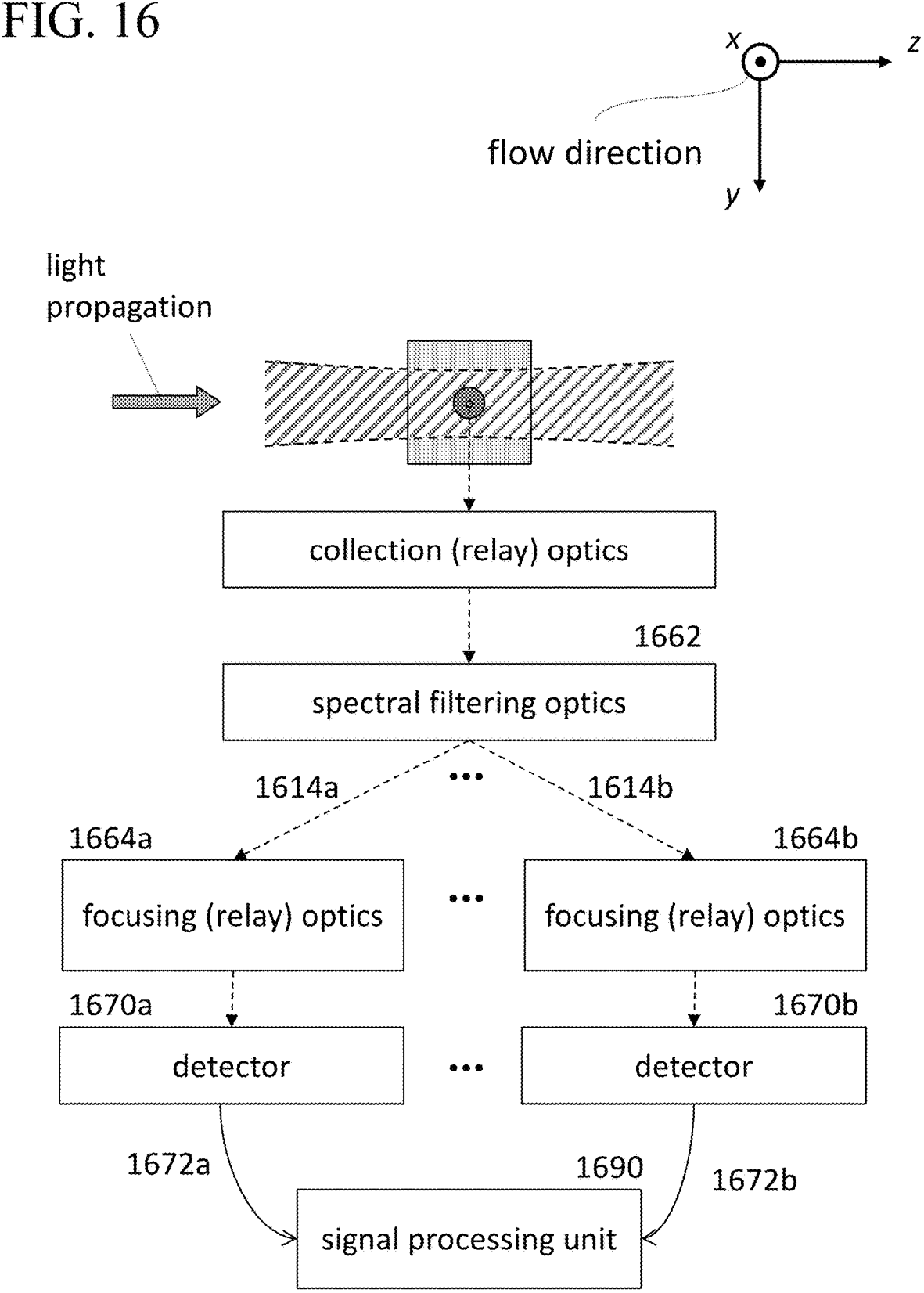
FIG. 16 is a schematic representation of the light collection and detection subsystem of a particle analyzer and/or sorter with multiple spectral detection bands in accordance with some embodiments.

In FIGS. 15 and 16, the relative orientation of fluid flow, light propagation, and transverse directions is shown, respectively, as the set of axes x, z, and y. The process steps involved in the performance of some embodiments of the present disclosure are described here with reference to FIGS. 15 and 16, and are also further summarized in flow-chart fashion in FIG. 17.

FIG. 15 illustrates a cross-section, perpendicular to the direction of fluid flow, of a possible light collection configuration of a configurable or modular flow cytometry apparatus, according to some embodiments of the present disclosure. A flowcell 1500 (as described, e.g., above in reference to FIGS. 1-3, 6-8, 9A-9C, 10, 12, and 13), of which the inner part is schematically indicated in the figure, provides a channel for fluid flow. Sheath fluid 1520 is provided to confine the fluid 1530 carrying particles 1555 to be analyzed, as described, e.g., above in reference to FIGS. 3-5. The sheath fluid 1520 and the sample-carrying fluid 1530 are focused into the flowcell 1500 lumen, optionally by hydrodynamic means; such focusing produces a sample core stream 1530 bounded by the sheath fluid 1520. An interrogating light beam or beams 1540 are provided to interact with the particles in the sample core stream, as described, e.g., above with reference to FIGS. 1 and 2. The beam or beams 1540, usually having a Gaussian intensity profile, but also optionally having, e.g., flat-top or other profiles, are generally focused into a relatively tight spot in the plane of the sample core stream, as described, e.g., above with reference to FIG. 10. Particles 1555 to be analyzed in the sample core stream 1530 interact with light in the beam or beams 1540 to generate optical signals 1510 by optical processes including, for instance, scattering, absorption, or fluorescence, as described, e.g., above with reference to FIGS. 1 and 2. The optical signals 1510 are collected by collection optics 1560, as described, e.g., above with reference to FIG. 13. The collected optical signals 1512 are then conveyed (relayed) to spectral filtering optics 1562 to select appropriate spectral bands of the optical signals for detection, as described, e.g., above with reference to FIG. 14. The spectral filtering optics 1562 may include, without limitation, reflective, transmissive, absorptive, diffractive, or holographic means, or means based on interference, or a combination thereof. The resulting spectrally filtered optical signals 1514 are then conveyed (relayed) as signals 1516 by focusing optics 1564 to a detector 1570, as described, e.g., above with reference to FIG. 14. The detector converts the light signals 1516 into electrical signals 1572, which are then conveyed to a processing unit 1590 for further analysis, processing, and optionally storage, as described below. Together, the collection optics 1560 and the focusing optics 1564 may be referred to as relay optics.

In some embodiments, more than one spectral band output may be generated. For instance, FIG. 16 illustrates a cross-section, perpendicular to the direction of fluid flow, of another possible light collection configuration of a configurable or modular flow cytometry apparatus, according to some embodiments of the present disclosure. It is similar in concept to the configuration illustrated in FIG. 15 except that the spectral filtering optics 1662 produce more than one spectral band output 1614*a* and 1614*b*, separated according to spectral characteristics. Each spectral band is then conveyed (relayed) to a separate set of focusing optics 1664*a* and 1164*b* and separate detectors 1670*a* and 1670*b*, resulting in respectively separate electrically converted signals 1672*a* and 1672*b*. The resulting electrical signals are then routed to signal processing unit 1690 for further elaboration. FIG. 16 depicts, for the sake of clarity, two sets of spectral bands, focusing optics, and detectors; it will be apparent to those skilled in the art that an arbitrary number of such sets is encompassed by the scope of the present disclosure, as described, e.g., above with reference to FIGS. 1, 2, 9A-9C, 12, 14, and further described below with reference to FIG. 19.

Figure 17:
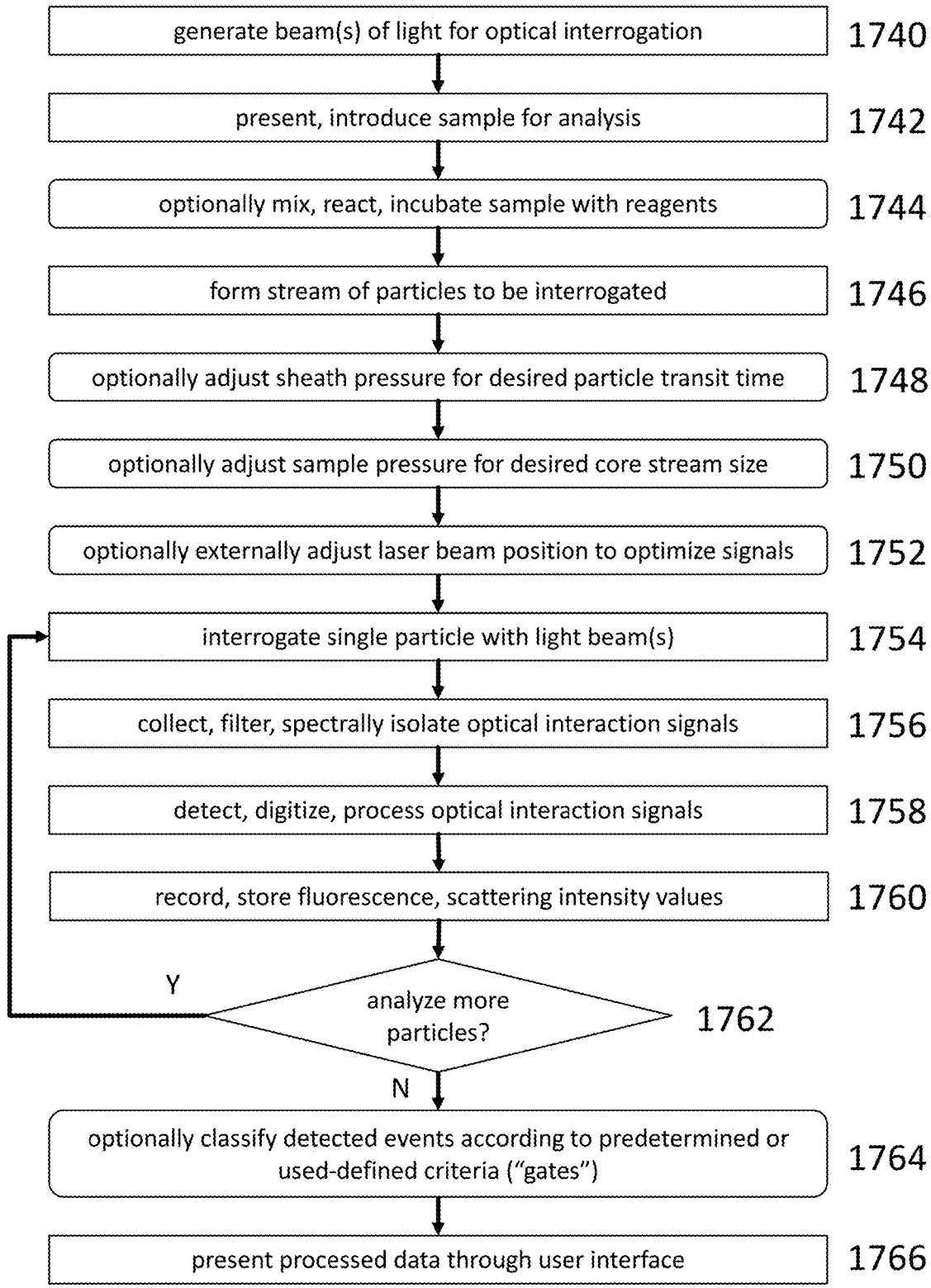
FIG. 17 is a flow chart describing a sequence of principal operations involved in the performance of a method of particle analysis in accordance with some embodiments.

FIG. 17 is a flow chart that describes a method of particle analysis, that can be performed using a configurable or modular flow cytometry apparatus, in accordance with some embodiments of the present disclosure. For example, the method of FIG. 17 can be performed using any of the configurable or modular flow cytometry apparatuses shown in FIGS. 1-8, 9A-9C, and/or 10-16. Step 1740 comprises generating one or more beams of light for optical interrogation of particles in a sample, as described, e.g., above with reference to FIG. 10. Step 1742 comprises presenting a sample, or introducing a sample, to the apparatus by a user or operator. Optionally, step 1744 comprises mixing, reacting, and incubating the sample with one or more reagents, such that the reagents may be preloaded onboard the apparatus or may be introduced by the user or operator. Step 1746 comprises forming, by means, e.g., without limitation, of hydrodynamic focusing of the sample by sheath fluid, a core stream of particles flowing essentially one at a time through the laser beam(s) in the microchannel portion of the flowcell for optical interrogation. An optional step 1748 comprises adjusting sheath pressure to achieve a desired average particle transit time across the light beam(s), as described, e.g., above with reference to FIG. 3 and/or FIG. 4. An optional step 1750 comprises adjusting sample pressure to achieve desired cross-sectional dimensions of the sample core stream, as described, e.g., above with reference to FIG. 3 and/or FIG. 5. An optional step 1752 comprises adjusting the position of the light beam(s) (e.g., transversally to the direction of fluid flow) by external actuation of lens positioning stage(s), as described, e.g., above with reference to FIG. 11. Step 1754 comprises interrogating, by optical interaction, a single particle in the sample core stream by the one or more light beams, resulting in the generation of optical interaction signals, as described, e.g., above with reference to FIGS. 12, 15, and 16. Step 1756 comprises collecting the optical interaction signals, the optical filtering of the collected optical signals, and the spectral isolation of the filtered optical signals, as described, e.g., above with reference to FIGS. 9A-9C and 12-16. Step 1758 comprises detecting the spectrally isolated optical signals, transducting said signals into analog electrical signals, digitizing the analog electrical signals into digital signals, and processing the digital signals. Step 1760 comprises recording and storing the detected and processed signal parameters, including, without limitation, fluorescence intensity in one or more spectral bands, phase shift, scattering intensity, and absorption. Step 1762 comprises presenting a decision, which may be automated or presented by the system through a processing unit, to the user or operator as a call for action, on whether to analyze additional particles; if the choice is positive, the method workflow returns to the step 1754; if the choice is negative, the method workflow continues to optional step 1764 or step 1766. Optional step 1764 comprises classifying a portion or a totality of the events detected and analyzed according to certain criteria (which may include, without limitation, entities commonly referred to in the art as "triggers," "thresholds," and "gates"), which may be predetermined and preloaded into the apparatus or may be selected or modified or created by the user. Step 1766 comprises presenting to the user or operator the processed data (which may include, without limitation, the raw detected time-varying signals, a list of detected particle-interrogation events, and/or graphs or plots of detected events displayed according to characteristics such as, e.g., fluorescence intensity and scattering intensity) by means of a user interface such as, e.g., a screen, a computer monitor, a printout, or other such means.

Figure 18:
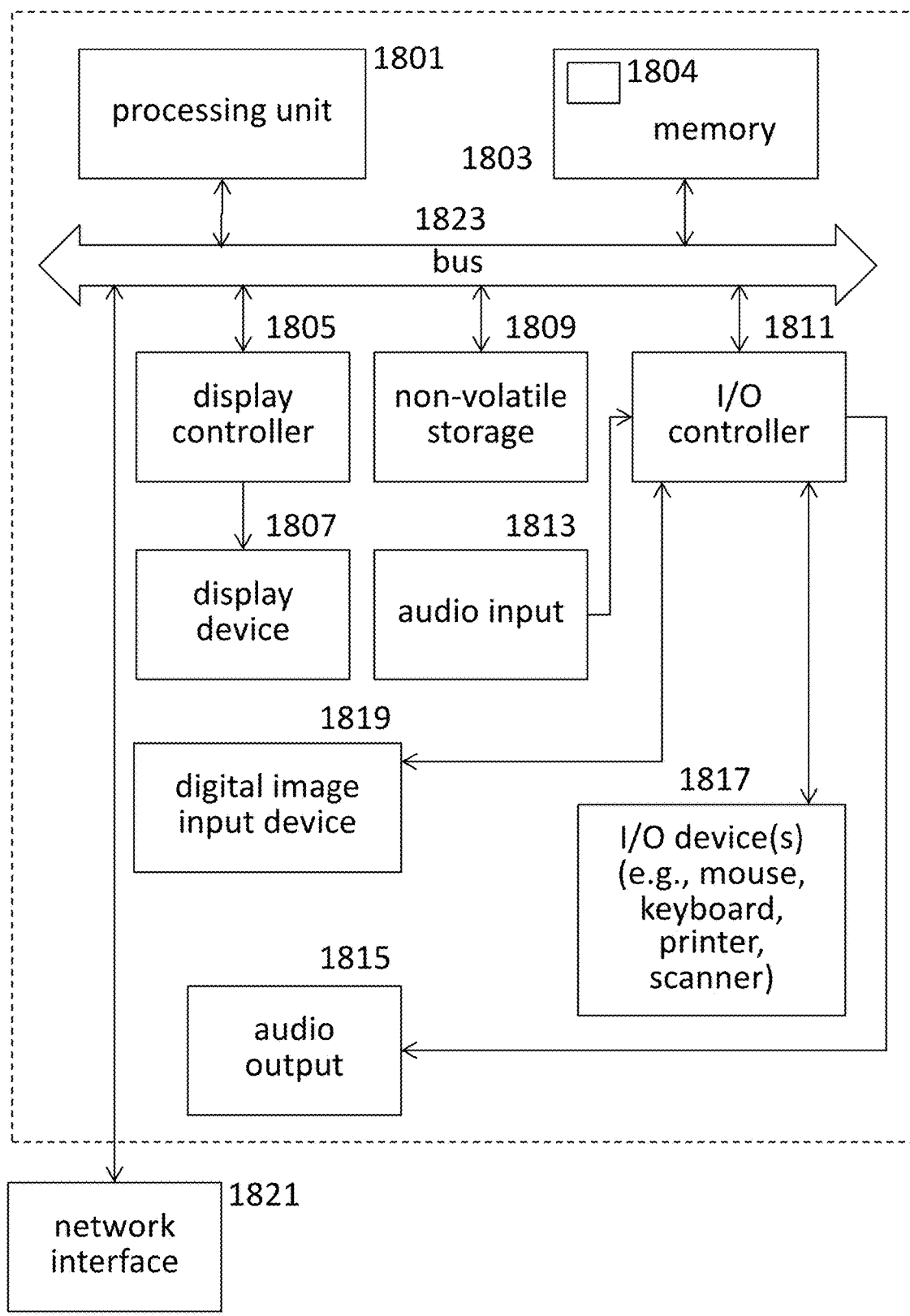
FIG. 18 is a schematic representation of a data processing system to provide an analyzer and/or sorter in accordance with some embodiments.

FIG. 18 shows a block diagram of an exemplary embodiment of a data processing system 1800 to provide a particle analysis and sorting system as described herein. In an embodiment, data processing system 1800 is a part of the control system to perform a method that includes providing a light beam; providing a sample for analysis; exposing the sample to the light beam; detecting optical emissions from the exposed sample; and recording electrical analogues of the emissions, as described herein. In some embodiments, data processing system 1800 is represented by any one of signal processing units 190, 290, 1590, and 1690 depicted in FIGS. 1, 2, 15, and 16, respectively, and further optionally incorporates any one of data storage units 192 and 292 depicted in FIGS. 1 and 2, respectively.

Data processing system 1800 includes a processing unit 1801 that may include a microprocessor or microcontroller, such as Intel microprocessor (e.g., Core i7, Core 2 Duo, Core 2 Quad, Atom), Sun Microsystems microprocessor (e.g., SPARC), IBM microprocessor (e.g., IBM 750), Motorola microprocessor (e.g., Motorola 68000), Advanced Micro Devices ("AMD") microprocessor, Texas Instrument microcontroller, and any other microprocessor or microcontroller.

Processing unit 1801 may include a personal computer (PC), such as a Macintosh® (from Apple Inc. of Cupertino, California), Windows®-based PC (from Microsoft Corporation of Redmond, Washington), or one of a wide variety of hardware platforms that run the UNIX operating system or other operating systems. For at least some embodiments, processing unit 1801 includes a general purpose or specific purpose data processing system based on Intel, AMD, Motorola, IBM, Sun Microsystems, IBM processor families, or any other processor families. As shown in FIG. 18, a memory 1803 is coupled to the processing unit 1801 by a bus 1823. Memory 1803 has instructions and data 1804 stored thereon which when accessed by processing unit 1801 cause the processing unit 1801 to perform methods to provide, for example, particle analysis and optionally sorting, as described herein.

Memory 1803 can be dynamic random access memory ("DRAM") and can also include static random access memory ("SRAM"). A bus 1823 couples processing unit 1801 to memory 1803 and also to a non-volatile storage 1809 and to a display controller 1805 (if a display is used) and to input/output (I/O) controller(s) 1811. Display controller 1805 controls in the conventional manner a display on a display device 1807 which can be a cathode ray tube (CRT), a liquid crystal display (LCD), a light-emitting diode (LED) monitor, a plasma monitor, or any other display device. Input/output devices 1817 can include a keyboard, disk drives, printers, a scanner, a camera, and other input and output devices, including a mouse or other pointing device. I/O controller 1811 may also be coupled to one or more audio input devices 1813 such as, for example, one or more microphones.

Display controller 1805 and I/O controller 1811 can be implemented with conventional well-known technology. An audio output 1815 such as, for example, one or more speakers, may be coupled to I/O controller 1811. Non-volatile storage 1809 can be a magnetic hard disk, an optical disk, a solid-state drive, a flash drive, or another form of storage for large amounts of data. Some of this data is often written, by a direct memory access process, into memory 1803 during execution of software in data processing system 1800 to perform methods described herein.

One skilled in the art will immediately recognize that the terms "computer-readable medium" and "machine-readable medium" include any type of storage device that is accessible by processing unit 1801. Data processing system 1800 can interface to external systems through a modem or network interface 1821. It will be appreciated that, in some cases, modem or network interface 1821 can be considered to be part of data processing system 1800. This interface 1821 can be an analog modem, ISDN modem, cable modem, token ring interface, satellite transmission interface, Wi-Fi, Bluetooth, cellular network communication interface, or other interfaces for coupling a data processing system to other data processing systems.

It will be appreciated that data processing system 1800 is one example of many possible data processing systems which have different architectures. For example, personal computers based on an Intel microprocessor often have multiple buses, one of which can be an input/output (I/O) bus for the peripherals and one that directly connects processing unit 1801 and memory 1803 (often referred to as a memory bus). The buses are connected together through bridge components that perform any appropriate translation due to differing bus protocols.

Network computers are another type of data processing system that can be used with the embodiments as described herein. Network computers do not usually include a hard disk or other mass storage, and the executable programs are loaded from a network connection into memory 1803 for execution by processing unit 1801. A typical data processing system will usually include at least a processor, memory, and a bus coupling the memory to the processor.

It will also be appreciated that data processing system 1800 can be controlled by operating system software which includes a file management system, such as a disk operating system, which is part of the operating system software. Operating system software can be the family of operating systems known as Macintosh® Operating System (Mac OS®) or Mac OS X® from Apple Inc. of Cupertino, California, or the family of operating systems known as Windows® from Microsoft Corporation of Redmond, Washington, and their associated file management systems. The file management system is typically stored in non-volatile storage 1809 and causes processing unit 1801 to execute the various acts required by the operating system to input and output data and to store data in memory, including storing files on non-volatile storage 1809.

In various embodiments, hardwired circuitry may be used in combination with software instructions to implement methods described herein. A non-transitory machine-readable medium can be used to store software and data which when executed by a data processing system causes the system to perform various methods described herein. This executable software and data may be stored in various places including for example ROM, volatile RAM, non-volatile memory, and/or cache. Portions of this software and/or data may be stored in any one of these storage devices.

Thus, a machine-readable medium includes any mechanism that provides (i.e., stores and/or transmits) information in a form accessible by a machine (e.g., a computer, network device, or any device with a set of one or more processors, etc.). For example, a machine-readable medium includes recordable/non-recordable media (e.g., read only memory (ROM); random access memory (RAM); magnetic disk storage media; optical storage media; flash memory devices; and the like).

It will be further appreciated that data processing system 1800 may be functionally implemented by allocating several of its functions to distributed units or modules separate from a central system. In some embodiments, some or all of the signal processing functions as depicted, e.g., in FIGS. 1 and 2 and illustrated in FIGS. 15 and 16, may be performed by signal processing units or modules physically separate from data processing system 1800, yet connected with it for performance of other functions, such as, e.g., input/output, display, data storage, memory usage, bus usage, additional signal processing functions, and both specific-purpose and general-purpose data processing functions. In some embodiments, some or all of the data storage functions as depicted, e.g., in FIGS. 1 and 2 and illustrated in FIGS. 15 and 16, may be performed by data storage units or modules physically separate from data processing system 1800, yet connected with it as described above. In some embodiments, some or all of the signal processing functions mentioned may be performed by processing unit 1801 internal to data processing system 1800, and in some embodiments some or all of the data storage functions mentioned may be performed by non-volatile storage unit 1809 and/or memory unit 1803 internal to data processing system 1800.

The methods as described herein can be implemented using dedicated hardware (e.g., using Field Programmable Gate Arrays, Digital Signal Processing chips, or Application Specific Integrated Circuits) or shared circuitry (e.g., microprocessors, microcontrollers, single-board computers, standalone computers, or cloud-based processors on remote servers) under control of program instructions stored in a machine-readable medium. The methods as described herein can also be implemented as computer instructions for execution on a data processing system, such as system 1800 of FIG. 18.

Figure 19:
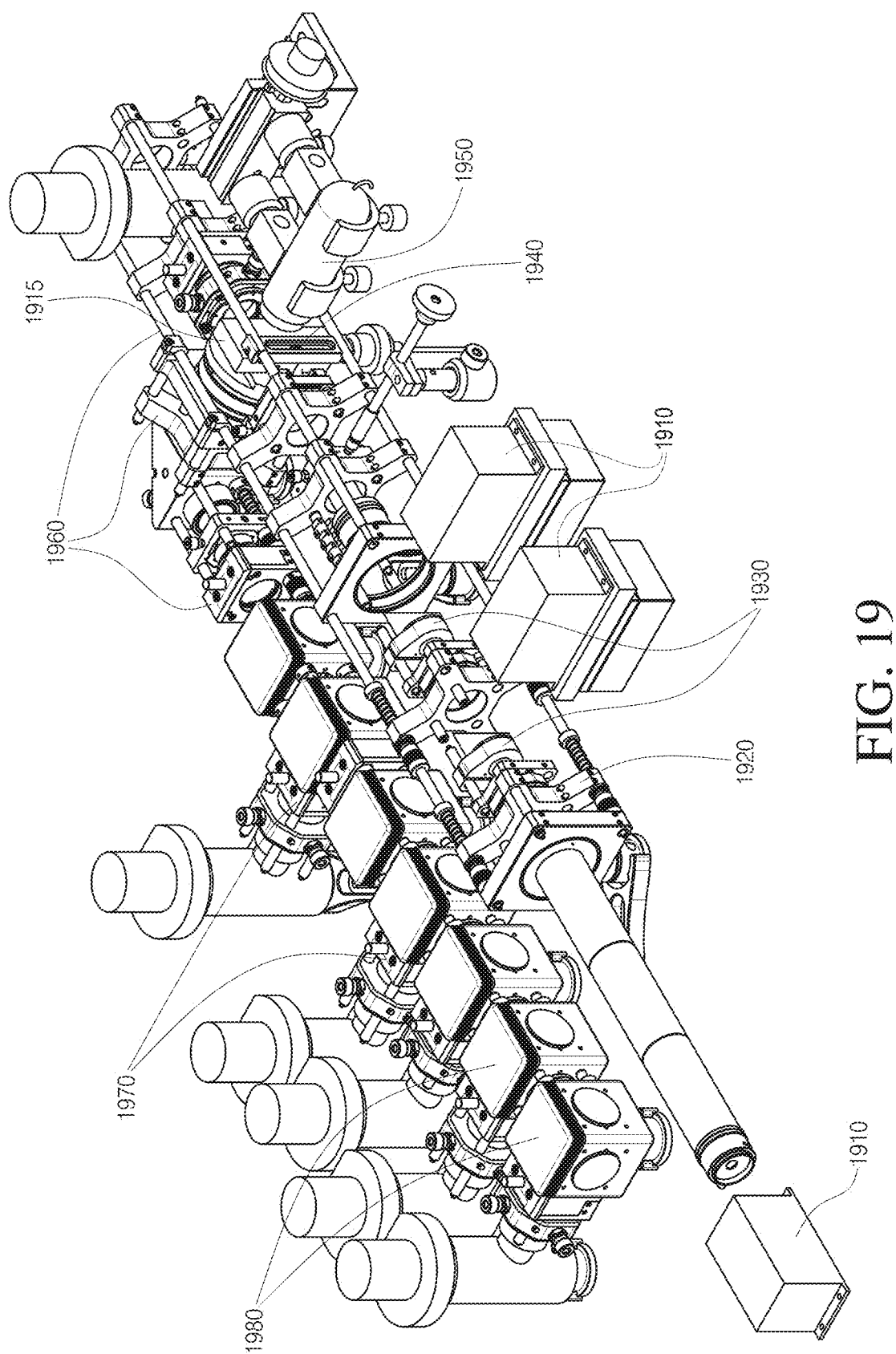
FIG. 19 is a mechanical drawing of a modular optical subsystem of an apparatus in accordance with some embodiments.

FIG. 19 is a mechanical drawing of a modular optical subsystem (also referred to as optical bench) of a configurable or modular flow cytometry apparatus, in accordance with some embodiments of the present disclosure. This Computer-Aided Design (CAD) drawing illustrates many of the elements, modules, and subsystems described herein, and it additionally illustrates an embodiment of mechanical architecture and elements used to provide the apparatus with desirable modularity and flexibility. In some embodiments, the optical subsystem of a configurable or modular flow cytometry apparatus described herein comprises mechanical and optomechanical supports such as, optionally and without limitation, rods, rod collars, rod adapters, cage plates, removable cage plates, cage mirror mounts, cage lens mounts, cage translation stages, cage rotation stages, cage brackets, removable cage brackets, cage reducers, cage adapters, cage lens tube adapters, lens tubes, lens tube couplers, lens tube reducers, lens tube caps, cage filter holders, kinematic cage filter holders, magnetic kinematic filter holders, kinematic cage beamsplitter cubes, magnetic kinematic cage beamsplitter cubes, longitudinal-translation rod-mounted adjustments, micrometer actuators, fasteners, pillars, pillar posts, pedestals, posts, post holders, holding forks, bases, brackets, blocks, plates, clamps, and other optomechanical components as are known in the art. In one embodiment, a cage plate or other rod-mounted cage element is allowed to translate along one or more cage rods, optionally under the control of a longitudinal-translation rod-mounted adjustment 1920, in order to flexibly achieve longitudinal positioning of one or more optical elements attached to such cage element. The use of a rod-and-cage architecture 1960 as illustrated in FIG. 19 permits the modular flexibility described above, e.g., in reference to FIGS. 9A-9C with respect to the variable number of lasers 1910 and detection channels easily configured on an apparatus according to this disclosure.

In the example illustrated in FIG. 19, each of the beam combiners, such as those described in relation to FIGS. 9A-9C and 10, is secured into a tip/tilt mount 1930, which mount is optionally further fastened to an optionally magnetic kinematic mount for ease of removal and reinsertion. This feature enables flexibility in reconfiguring the optical excitation of an apparatus, even when, e.g., desired laser excitation sources 1910 are substantially incompatible due to optical transmission requirements. For example, when one of the excitation sources (e.g., the external laser in FIG. 19) is a deep UV laser, such as, without limitation, a 266-nm source, in one embodiment the beam from such laser is combined into the apparatus using, e.g., a shortpass beam combiner, as described above in relation to FIG. 10. In another embodiment, as also described above, the beam from such laser is sent unimpeded to the focusing cylindrical lenses; having the beam combiners mounted on easily removable and easily re-positionable stages 1930 (i.e., without requiring realignment of the laser beam(s)) constitutes a desirable improvement over alternatives where re-alignment would be necessary.

In the example illustrated in FIG. 19, a dedicated digital microscope 1950 is provided to allow monitoring of the sample core stream (or absence thereof) in the flowcell (housed in flowcell assembly 1915). In one embodiment, microscope 1950 comprises an externally controllable focusing element (such as, without limitation, a liquid-lens element, a motorized stage, a motorized lens, an electrically controllable zoom, and other devices known in the art). By providing to an operator the ability to adjust the focus of the microscope 1950 externally without needing to physically access the microscope 1950 itself or the optional translation stage it may be mounted on, the externally controllable focusing element provides flexibility and ease of operation in fine-tuning, adjusting, modifying, or adapting the focus of the microscope to a sample core stream that may vary in size and/or position within the flowcell 1915.

In the example illustrated in FIG. 19, a bracket or holder 1940 is provided to hold an optical element (such as, without limitation, a polarizer or a filter) between the microscope 1950 and the flowcell 1915. Such optical element may be used to reduce the amount of light of certain wavelengths or of certain polarizations that reaches the microscope, resulting in an altered balance of the detected light. For example, a longpass filter may be used to reduce the amount of scattered laser light that reaches the microscope, while accepting a substantial portion or even most of fluorescent emissions from particles in a sample stream. The bracket or holder 1940 may be translatable so that the optical element may be placed in a position in the optical path between the flowcell 1915 and the microscope 1950, or in a position outside of such optical path.

In another embodiment, a longpass beamsplitter is provided between the flowcell 1915 and the microscope 1950 such that scattered light from particles in the sample stream is reflected by the beamsplitter to a side-scatter photodetector (such as, without limitation, a PMT, an SiPM, an APD, or a PD), optionally after passing through additional elements such as filters, lenses, and/or mirrors, and such that fluorescent light emitted from particles in the sample stream is transmitted through the beamsplitter to the microscope. This embodiment allows the collection of, e.g., without limitation, scattered light (at wavelengths such as, without limitation, 266 nm, 280 nm, 320 nm, or other wavelengths) that may otherwise be undesirably attenuated or reduced by passage through a collection lens assembly.

In the example illustrated in FIG. 19, optical filters incorporated in the apparatus may be housed in removable kinematic filter holders 1970. This embodiment allows an operator to quickly remove a filter and replace it with another, also mounted in a substantially identical filter holder. Likewise, beamsplitters incorporated in the apparatus may be housed in removable, optionally magnetic, kinematic cage cube inserts 1980. This embodiment allows an operator to easily and quickly remove a beamsplitter and replace it with another, also mounted in a substantially identical cage cube insert. The kinematic design of such filter holders and cage cubes allows swapping of like holders and like inserts without the need to perform optical realignment, which represents an advantage for operators of an apparatus of the present disclosure in terms of workflow, time, and convenience.

It will be appreciated by those skilled in the art that aspects of the present disclosure, while illustrated with reference to applications to particle analysis and sorting and particularly to flow cytometry, also present advantages in other application areas. The concept of modular excitation and emission architectures, for example, is also advantageous to the field of imaging, in particular to the field of microscopy, and more particularly to the field of fluorescence microscopy. Whereas in a flow cytometer an "event" is defined as the passage of a particle through the interrogation area, in microscopy the roughly equivalent element is a "pixel," defined as the smallest resolvable unit of an image. Detection sensitivity and adaptability to different sample types is just as desirable in fluorescence microscopy as it is in flow cytometry, and the present disclosure offers a solution to both by providing a modular and flexible optical architecture. The present disclosure admits of implementation within the framework of a fluorescence microscope in ways that parallel very closely the specific examples given in the case of flow-based particle analysis. A microscopy application of the present disclosure, for example, would rely on a system configuration very similar to that of FIG. 1, with the fluid elements 140, 142, 100, and 144 replaced by a suitable sample holder, such as are well known in the art, for exposure of the sample to the beam; and similarly for FIGS. 15 and 16. In other words, adaptation of the present disclosure to the field of microscopy is fully within the scope of this disclosure, given the descriptions of the novel apparatus and methods herein. One specific application of fluorescence microscopy that would benefit from the present disclosure is in vitro imaging, such as, e.g., methods and apparatuses used for research, microbiological analysis, or clinical diagnostics of collected specimens, such as, without limitation, tissue sections, biopsies, cultured cells, bacterial colonies, and cell organoids. Another specific application of fluorescence microscopy that would benefit from the present disclosure is in vivo imaging, such as, e.g., methods and apparatuses used for medical diagnostics. These include the analysis and diagnosis of externally optically accessible organs, such as the skin and the eye, as well as organs optically accessible through the use of endoscopes, such as the respiratory tract, the gastrointestinal tract, and, in the context of surgery, any other organ or part of the body. As in the case of laboratory-based fluorescence microscopy, adaptation of the apparatuses and methods described herein is entirely within the scope of the present disclosure, requiring only minor modifications of the apparatus and process steps from the illustrative examples that are provided. The usefulness of the present disclosure is therefore not to be circumscribed to the examples and figures provided, but extends to the full scope of what is claimed.

In the foregoing specification, embodiments of the current disclosure have been described with reference to specific exemplary embodiments thereof. It will, however, be evident that various modifications and changes may be made thereto without departing from the broader spirit and scope of the disclosure. The specification and drawings are, accordingly, to be regarded in an illustrative rather than a restrictive sense. It will further be appreciated that when dealing with real measurements subject to effects including, without limitation, noise, background, uncertainty, instrument error or drift, component variability, and/or environmental effects, there may be departures, sometimes substantial, from the illustrations and depictions presented here. Even when such effects are low or minimized, other effects may act to mask, distort, alter, modify, or otherwise change the relationships among the various mathematical and physical quantities mentioned here.

A method of analyzing particles in a sample using a particle analyzer is disclosed, comprising: providing a source of a beam of optical energy; providing a sample holder configured to expose a sample to the beam; providing a detector, the detector comprising a number of spectral detection channels, the channels being sensitive to distinct wavelength sections (or bands) of the electromagnetic spectrum and being configured to detect optical signals resulting from interactions between the beam and the sample, the channels being further configured to convert the optical signals into respective electrical signals; providing a first optical path from the source of the beam to the sample; providing a second optical path from the sample to the detector; providing a signal processing module; exposing the sample to the beam, and using the signal processing module for: receiving the electrical signals from the detector; and storing the electrical signals.

A method of analyzing and sorting particles in a sample using a particle analyzer/sorter is disclosed, comprising: providing a laser as a source of a beam of optical energy; providing a flowcell configured as an optical excitation chamber for exposing to the beam a sample comprising a suspension of particles and for generating optical signals from interactions between the beam and the particles; providing a detector, the detector comprising a number of spectral detection channels, the channels being sensitive to distinct wavelength sections (or bands) of the electromagnetic spectrum and being configured to detect fluorescence optical signals resulting from interactions between the beam and the particles in the sample, the channels being further configured to convert the optical signals into respective electrical signals; providing a first optical path from the source of the beam to the sample; providing a second optical path from the sample to the detector; providing a flow path for the suspension of particles; providing connections between the flowcell and each of the flow path, the first optical path, and the second optical path; providing a signal processing module comprising one of an FPGA, a DSP chip, an ASIC, a CPU, a microprocessor, a microcontroller, a single-board computer, a standalone computer, and a cloud-based processor; exposing the particles in the sample to the beam; using the signal processing module for: receiving the electrical signals from the detector; processing the electrical signals to optionally produce actuation signals; and storing the electrical signals.

Optionally, the method further comprises providing a particle sorting actuator connected with the flow path, based on at least one flow diversion in the flow path, and further based on one of a transient bubble, a pressurizable chamber, a pressurizable/depressurizable chamber pair, a pressure transducer, and a pair of high-voltage plates placed on either side of a jet-in-air stream of piezoelectrically generated and selectively electrostatically charged droplets of the sheathed sample stream flow emerging from a nozzle; optionally providing an actuator driver connected with the actuator, the driver being configured to receive actuation signals from the signal processing module; providing at least one particle collection receptacle; and collecting at least one particle from the suspension of particles in the particle collection receptacle.

As used in the description and claims, the singular form "a", "an" and "the" include both singular and plural references unless the context clearly dictates otherwise. For example, the term "excitation source module" may include, and is contemplated to include, a plurality of excitation source modules. At times, the claims and disclosure may include terms such as "a plurality," "one or more," or "at least one;" however, the absence of such terms is not intended to mean, and should not be interpreted to mean, that a plurality is not conceived.

The term "about" or "approximately," when used before a numerical designation or range (e.g., to define a length or pressure), indicates approximations which may vary by (+) or (−) 5%, 1% or 0.1%. All numerical ranges provided herein are inclusive of the stated start and end numbers. The term "substantially" indicates mostly (i.e., greater than 50%) or essentially all of a device, substance, or composition.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed disclosure. "Consisting of" shall mean that the devices, systems, and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A modular particle analyzer, comprising:
   a first excitation source module that outputs a first substantially collimated light beam;
   a flowcell configured to receive a sample therethrough, wherein the sample is illuminated by the first substantially collimated light beam when in the flowcell;
   a stray light blocking module comprising a focusing lens, a pinhole, and a collimating lens, wherein the focusing lens is configured to focus light emitted from the flowcell through the pinhole, wherein the pinhole is configured to block stray or scattered light emitted from the flowcell, and wherein the collimating lens is configured to substantially collimate the light exiting the pinhole to output a second substantially collimated light beam; and
   a first detection module, comprising:
      a dichroic beamsplitter configured to separate the second substantially collimated light beam into a third substantially collimated light beam and a fourth substantially collimated light beam, wherein the spectra of the third and the fourth substantially collimated light beams are different from one another,
         wherein the dichroic beamsplitter is coupled to a kinematic cage cube insert; and
      a first photodetector configured to detect the third substantially collimated light beam, and a second photodetector configured to detect the fourth substantially collimated light beam.

2. The modular particle analyzer of claim 1, further comprising:
   from one to three additional excitation source modules, each emitting an additional substantially collimated light beam; and
   from one to three beam combiners configured to combine the first substantially collimated light beam and the additional substantially collimated light beams from the additional excitation source modules.

3. The modular particle analyzer of claim 2, further comprising a rod-and-cage rod architecture, wherein the one to three beam combiners are each coupled to a kinematic mount.

4. The modular particle analyzer of claim 2, wherein the first excitation source module comprises a first laser that emits light at a first wavelength, wherein a second excitation source module of the from one to three additional excitation source modules comprises a second laser that emits light at a second wavelength, and wherein the first wavelength is different from the second wavelength.

5. The modular particle analyzer of claim 1, further comprising an externally adjustable fine alignment module that adjusts the propagation direction of the first substantially collimated light beam.

6. The modular particle analyzer of claim 1, further comprising an obscuration mask and a forward scatter photodetector, wherein the obscuration mask is coupled to a translation stage, and wherein the obscuration mask comprises one or more elements configured to substantially block unwanted light from reaching the forward scatter photodetector.

7. The modular particle analyzer of claim 6, wherein the obscuration mask further comprises a relay lens configured to relay desired scattered light from a particle in a sample core stream in the flowcell onto an active surface of the forward scatter photodetector.

8. The modular particle analyzer of claim 1, further comprising:
   from one to ten additional detection modules, each comprising an additional dichroic beamsplitter, an additional kinematic cage cube insert, and an additional photodetector, wherein each of the additional dichroic beamsplitters is coupled to one of the additional kinematic cage cube inserts.

9. The modular particle analyzer of claim 8, wherein the first detection module and the additional detection modules each further comprise a spectral filter coupled to a cage filter holder.

10. The modular particle analyzer of claim 1, further comprising a microscope to monitor the sample in the flowcell.

11. The modular particle analyzer of claim 10, wherein the microscope comprises an externally controllable focusing element configured to monitor the sample in the flowcell.

12. The modular particle analyzer of claim 10, further comprising:
- a polarizer or a filter located between the flowcell and the microscope;
- a side-scatter photodetector; and
- a longpass beamsplitter located between the flowcell and the microscope, wherein the longpass beamsplitter is configured to reflect scattered light from the sample to the side-scatter photodetector.

13. A modular particle analyzer, comprising:
- a rod-and-cage architecture;
- from two to four excitation source modules each configured to output a substantially collimated light beam;
- from one to three beam combiners configured to combine the substantially collimated light beams from the each of the excitation source modules into a combined substantially collimated light beam, wherein the beam combiners are each coupled to a kinematic mount;
- a flowcell configured to receive a sample therethrough, wherein the sample is illuminated by the substantially combined collimated light beam when in the flowcell;
- a collimating lens configured to substantially collimate light emitted from the flowcell; and
- from one to ten detection modules, each comprising a dichroic beamsplitter and a photodetector, wherein each of the dichroic beamsplitters is coupled to a kinematic cage cube insert, wherein each dichroic beamsplitter is configured to separate light output from the collimating lens into additional substantially collimated light beams, and wherein the additional substantially collimated light beams are detected by the photodetectors.

14. The modular particle analyzer of claim 13, further comprising an externally adjustable fine alignment module configured to adjust the propagation direction of the substantially combined collimated light beam.

15. The modular particle analyzer of claim 13, further comprising a stray light blocking module comprising a focusing lens, a pinhole, and a collimating lens, wherein the focusing lens is configured to focus light emitted from the flowcell through the pinhole, wherein the pinhole is configured to block stray or scattered light emitted from the flowcell, and wherein the collimating lens is configured to substantially collimate the light exiting the pinhole.

16. The modular particle analyzer of claim 13, further comprising an obscuration mask and a forward scatter photodetector, wherein the obscuration mask is coupled to a translation stage, and wherein the obscuration mask comprises one or more elements configured to substantially block unwanted light from reaching the forward scatter photodetector.

17. The modular particle analyzer of claim 16, wherein the obscuration mask further comprises a relay lens configured to relay desired scattered light from a particle in a sample core stream in the flowcell onto an active surface of the forward scatter photodetector.

18. The modular particle analyzer of claim 13, wherein the detection modules each further comprise a spectral filter coupled to a cage filter holder.

19. The modular particle analyzer of claim 13, further comprising a microscope to monitor the sample in the flowcell.

20. The modular particle analyzer of claim 19, further comprising:
- a polarizer or a filter located between the flowcell and the microscope;
- a side-scatter photodetector; and
- a longpass beamsplitter located between the flowcell and the microscope, wherein the longpass beamsplitter is configured to reflect scattered light from the sample to the side-scatter photodetector.

* * * * *